US012671558B2

(12) United States Patent
Abotabl et al.

(10) Patent No.: US 12,671,558 B2
(45) Date of Patent: Jun. 30, 2026

(54) CODE BLOCK GROUP BASED CROSS-BANDWIDTH PART SCHEDULING

(71) Applicant: QUALCOMM Incorporated, San Diego, CA (US)

(72) Inventors: Ahmed Attia Abotabl, San Diego, CA (US); Abdelrahman Mohamed Ahmed Mohamed Ibrahim, San Diego, CA (US); Muhammad Sayed Khairy Abdelghaffar, San Jose, CA (US); Alexandros Manolakos, Escondido, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 391 days.

(21) Appl. No.: 18/256,038

(22) PCT Filed: Feb. 2, 2022

(86) PCT No.: PCT/US2022/014918
§ 371 (c)(1),
(2) Date: Jun. 5, 2023

(87) PCT Pub. No.: WO2022/169854
PCT Pub. Date: Aug. 11, 2022

(65) Prior Publication Data
US 2024/0048342 A1     Feb. 8, 2024

(30) Foreign Application Priority Data

Feb. 3, 2021     (GR) .............................. 20210100072

(51) Int. Cl.
*H04W 72/04*     (2023.01)
*H04L 1/1867*     (2023.01)
*H04L 5/00*     (2006.01)

(52) U.S. Cl.
CPC .......... *H04L 5/0092* (2013.01); *H04L 1/1893* (2013.01); *H04L 5/0053* (2013.01)

(58) Field of Classification Search
CPC .... H04L 5/0092; H04L 5/0053; H04L 1/1893
See application file for complete search history.

(56) References Cited

U.S. PATENT DOCUMENTS

2016/0007357 A1*  1/2016  Yano ..................... H04L 1/1812
                                                              370/329
2018/0343154 A1*  11/2018  Park ..................... H04L 5/0007
(Continued)

FOREIGN PATENT DOCUMENTS

KR         20180122918 A     11/2018
WO     WO-2019089125 A1     5/2019
WO     WO-2019099383 A1     5/2019

OTHER PUBLICATIONS

Huawei, et al., "On Cross-BWPs and Cross-Numerology Retransmission", 3GPP Draft, R1-1715572, 3GPP TSG RAN WG1 Meeting NR#3, 3rd Generation Partnership Project (3GPP), Mobile Competence Centre, 650, Route Des Lucioles, F-06921, Sophia-Antipolis Cedex, France, vol. RAN WG1, No. Nagoya, Japan, Sep. 18, 2017-Sep. 21, 2017, Sep. 17, 2017 (Sep. 17, 2017), XP051339039, 2 Pages.
International Search Report and Written Opinion—PCT/US2022/014918—ISA/EPO—May 20, 2022.

*Primary Examiner* — Mahbubul Bar Chowdhury
(74) *Attorney, Agent, or Firm* — Holland & Hart LLP/Qualcomm

(57) ABSTRACT

Methods, systems, and devices for wireless communications are described. A base station may transmit control signaling scheduling a downlink transmission to a user equipment (UE) across multiple bandwidth parts (BWPs) and an indication of a code block group (CBG)-based mapping for the downlink transmission. A transport block (TB) of the downlink transmission may include multiple code block groups (Continued)

(CBGs) that are mapped across the BWPs. The UE may monitor for the TB across the BWPs based on the CBG mapping. For example, the UE may determine the CBGs are mapped across different BWPs based on the cross-BWP CBG mapping. Additionally or alternatively, the UE may determine each CBG is mapped within one BWP based on the cross-BWP CBG BWPs mapping. The UE may calculate a TB size based on available time and frequency resources and may decode the TB based on calculating the TB size and the cross-BWP CBG mapping.

30 Claims, 17 Drawing Sheets

(56) References Cited

U.S. PATENT DOCUMENTS

| | | | | |
|---|---|---|---|---|
| 2018/0367259 A1* | 12/2018 | Hsieh | ................... | H04L 1/1861 |
| 2019/0141734 A1* | 5/2019 | Lei | ...................... | H04W 72/23 |
| 2019/0150122 A1* | 5/2019 | Ying | ................... | H04W 72/23 |
| | | | | 370/329 |
| 2020/0128529 A1* | 4/2020 | Wang | ................... | H04L 5/0091 |
| 2020/0305184 A1* | 9/2020 | Kim | ..................... | H04L 5/0053 |
| 2021/0021383 A1* | 1/2021 | Chen | ................... | H04L 1/1861 |
| 2021/0051632 A1* | 2/2021 | Jung | .................. | H04B 7/0404 |
| 2021/0144748 A1* | 5/2021 | Kim | ..................... | H04W 16/14 |
| 2021/0219337 A1* | 7/2021 | Li | ........................ | H04L 1/1819 |
| 2022/0287025 A1* | 9/2022 | Jin | ....................... | H04W 52/02 |

* cited by examiner

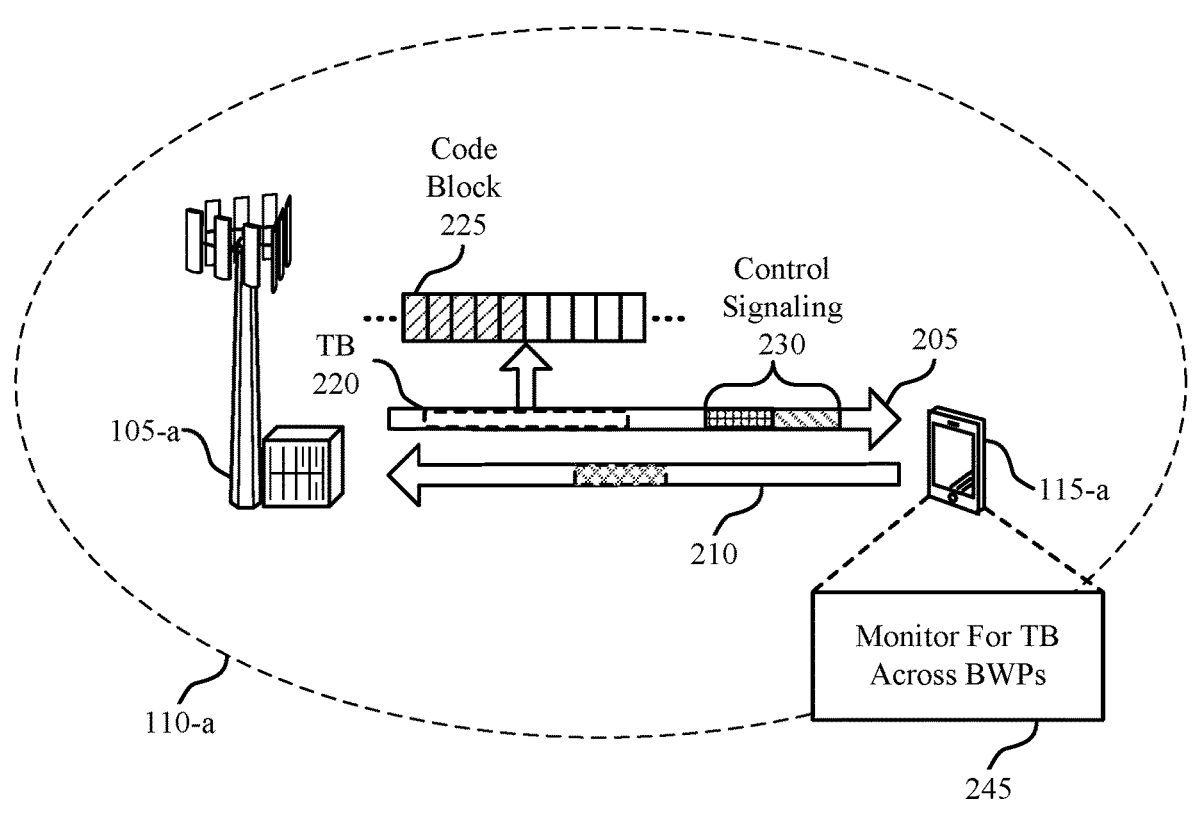
Code
Block
225
Control
Signaling
230
TB
220
205
105-a
115-a
210
110-a
Monitor For TB
Across BWPs
245
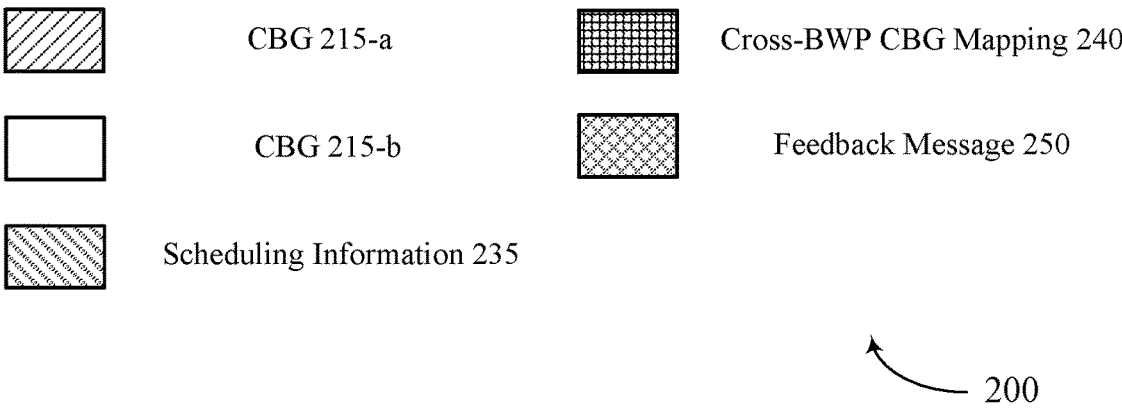
CBG 215-a                    Cross-BWP CBG Mapping 240
CBG 215-b                    Feedback Message 250
Scheduling Information 235
200
FIG. 2

300-a 300-b

CBG 305-a       DCI Message 325

CBG 305-b

Communications Manager

Scheduling Component

1025

Receiver

1010

CBG Mapping Component

1030

Transmitter

1015

TB Component

1035

1020

1005

1000

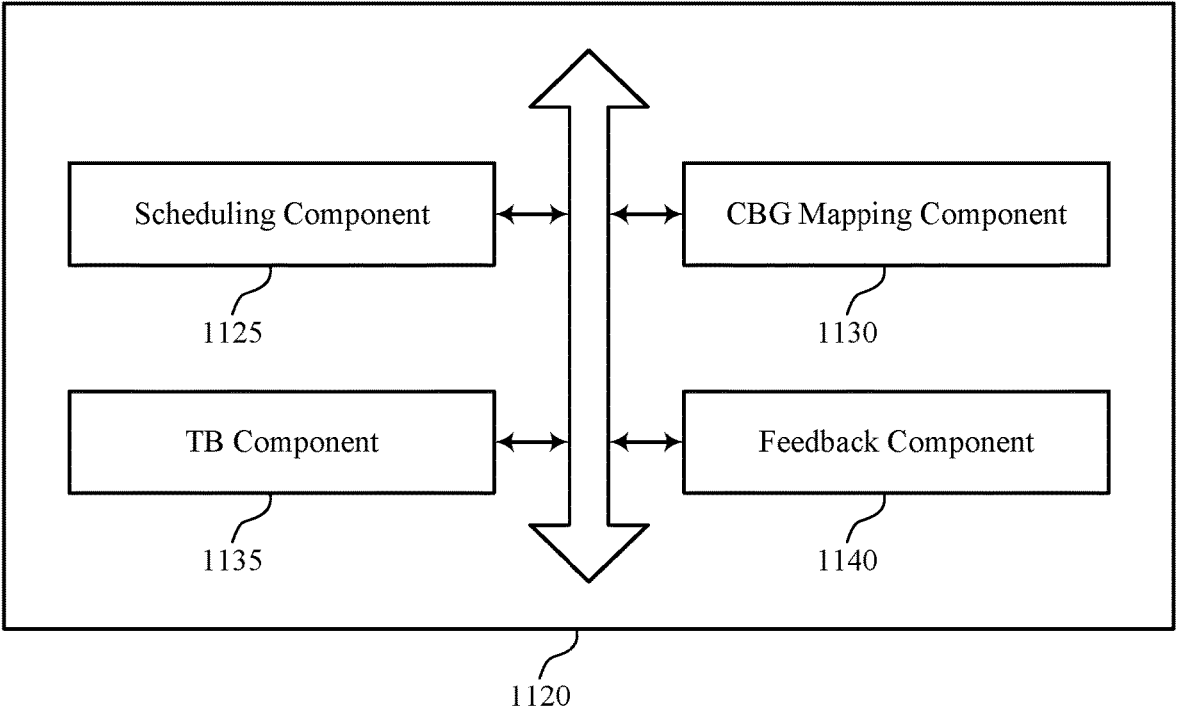
Scheduling Component
1125
CBG Mapping Component
1130
TB Component
1135
Feedback Component
1140
1120
1100
FIG. 11

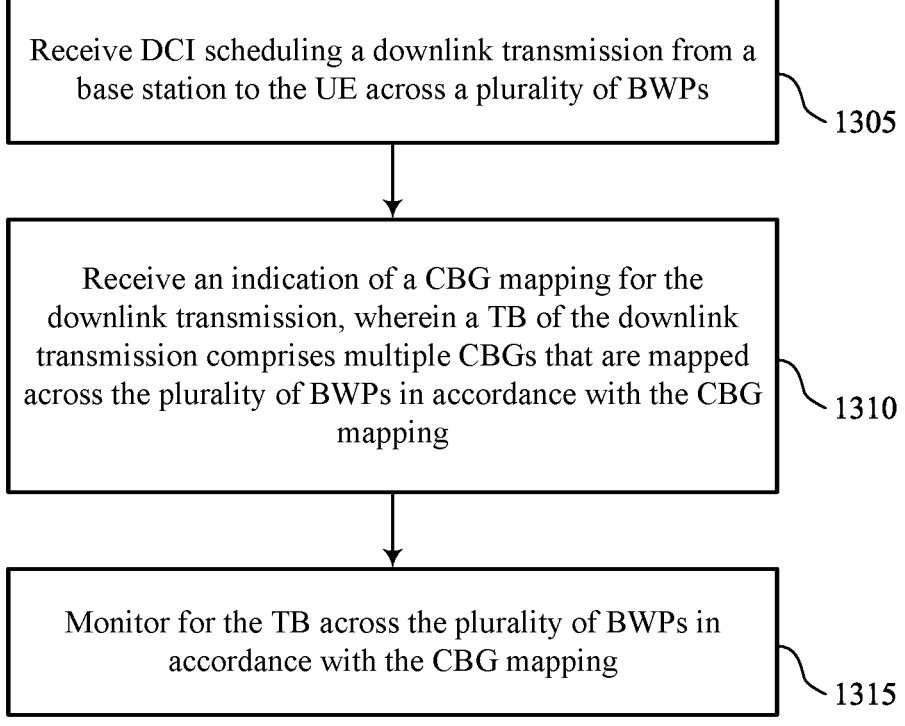

Receive DCI scheduling a downlink transmission from a base station to the UE across a plurality of BWPs

1305

Receive an indication of a CBG mapping for the downlink transmission, wherein a TB of the downlink transmission comprises multiple CBGs that are mapped across the plurality of BWPs in accordance with the CBG mapping

1310

Monitor for the TB across the plurality of BWPs in accordance with the CBG mapping

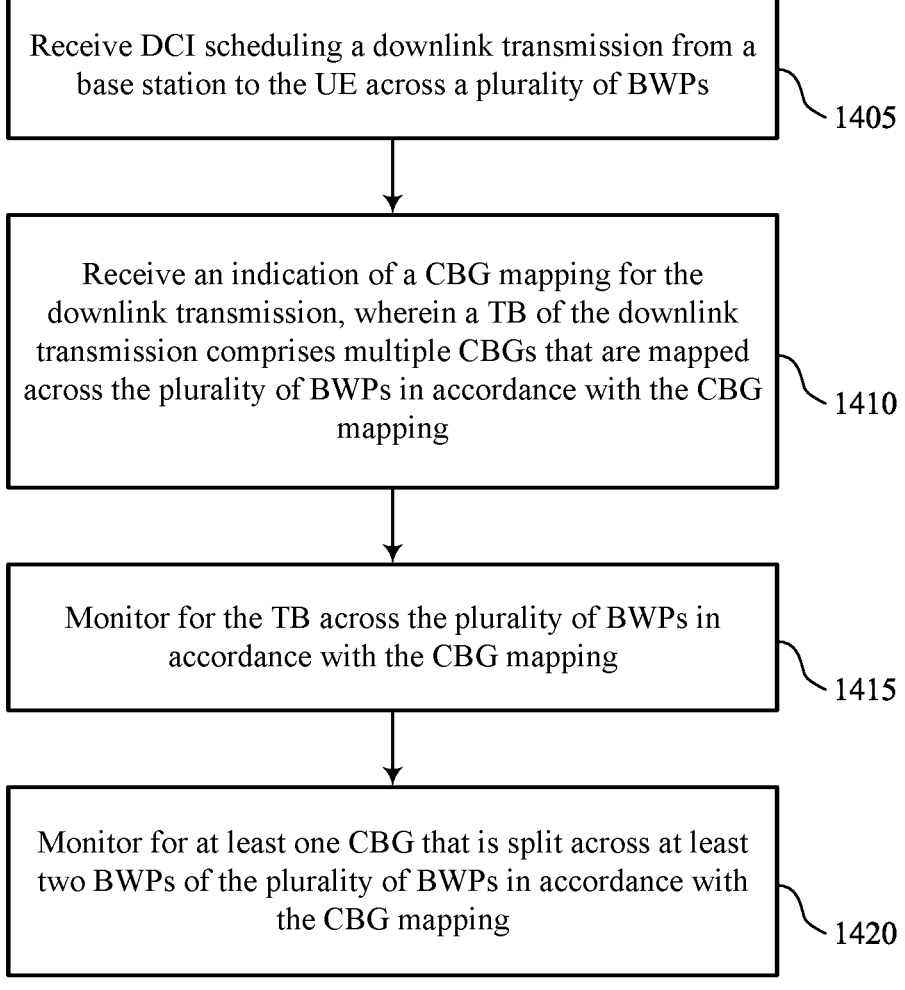

Receive DCI scheduling a downlink transmission from a base station to the UE across a plurality of BWPs ⟋ 1405

Receive an indication of a CBG mapping for the downlink transmission, wherein a TB of the downlink transmission comprises multiple CBGs that are mapped across the plurality of BWPs in accordance with the CBG mapping ⟋ 1410

Monitor for the TB across the plurality of BWPs in accordance with the CBG mapping ⟋ 1415

Monitor for at least one CBG that is split across at least two BWPs of the plurality of BWPs in accordance with the CBG mapping ⟋ 1420

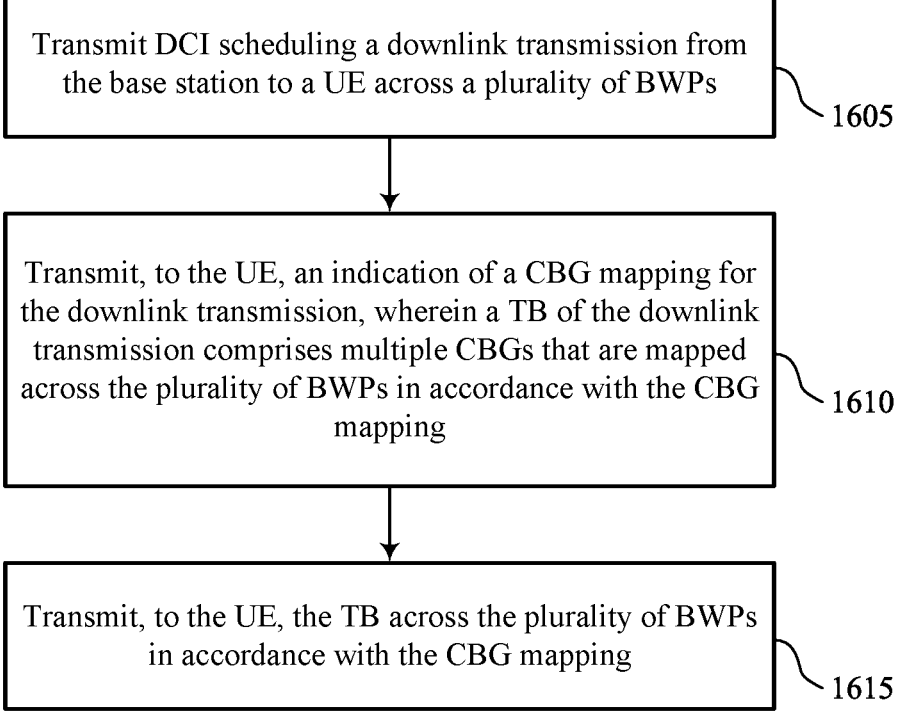

Transmit DCI scheduling a downlink transmission from the base station to a UE across a plurality of BWPs

1605

Transmit, to the UE, an indication of a CBG mapping for the downlink transmission, wherein a TB of the downlink transmission comprises multiple CBGs that are mapped across the plurality of BWPs in accordance with the CBG mapping

1610

Transmit, to the UE, the TB across the plurality of BWPs in accordance with the CBG mapping

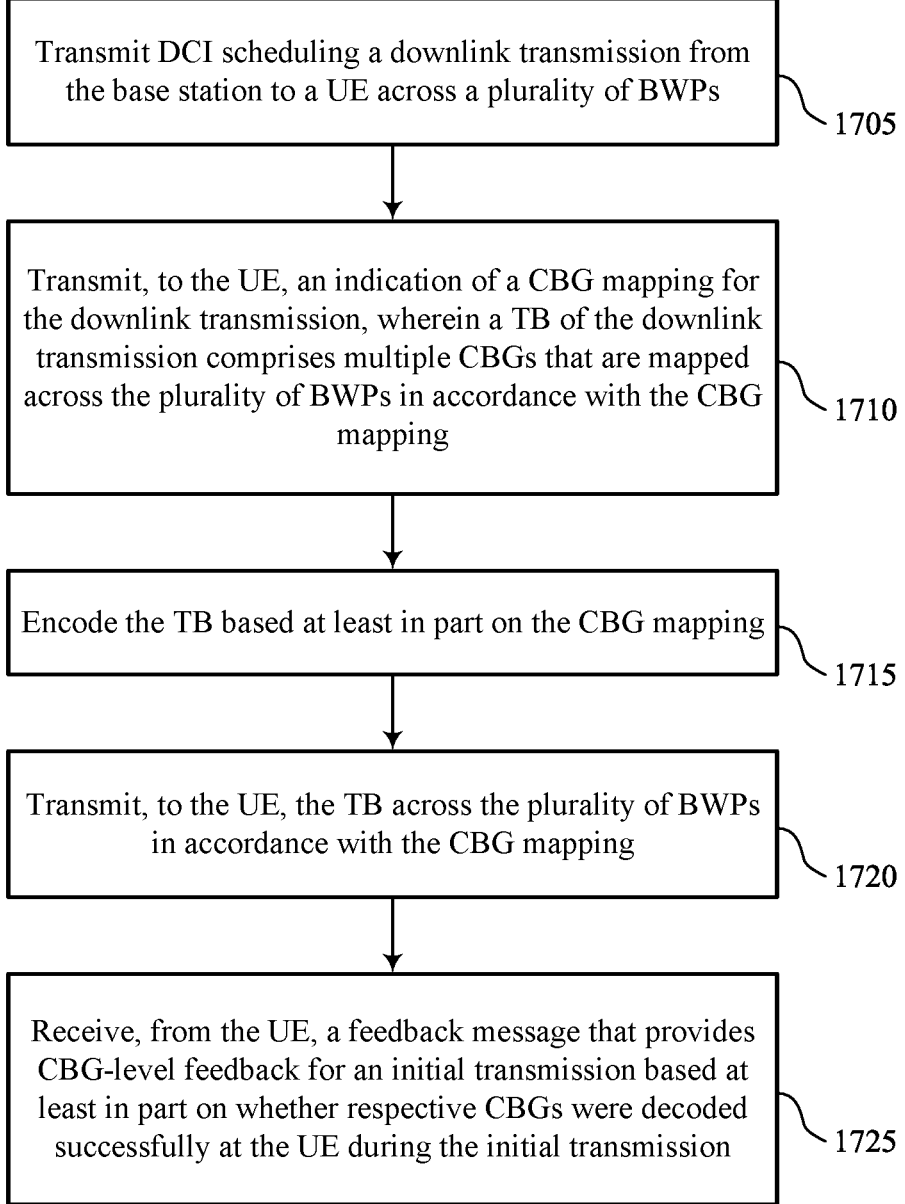

Transmit DCI scheduling a downlink transmission from the base station to a UE across a plurality of BWPs

1705

Transmit, to the UE, an indication of a CBG mapping for the downlink transmission, wherein a TB of the downlink transmission comprises multiple CBGs that are mapped across the plurality of BWPs in accordance with the CBG mapping

1710

Encode the TB based at least in part on the CBG mapping

1715

Transmit, to the UE, the TB across the plurality of BWPs in accordance with the CBG mapping

1720

Receive, from the UE, a feedback message that provides CBG-level feedback for an initial transmission based at least in part on whether respective CBGs were decoded successfully at the UE during the initial transmission

CODE BLOCK GROUP BASED CROSS-BANDWIDTH PART SCHEDULING

CROSS REFERENCE

The present Application is a 371 national stage filing of International PCT Application No. PCT/US2022/014918 by ABOTABL et al. entitled "CODE BLOCK GROUP BASED CROSS-BANDWIDTH PART SCHEDULING," filed Feb. 2, 2022; and claims priority to Greece Patent Application No. 20210100072 by ABOTABL et al., entitled "CODE BLOCK GROUP BASED CROSS-BANDWIDTH PART SCHEDULING," filed Feb. 3, 2021, each of which is assigned to the assignee hereof, and each of which is expressly incorporated by reference in its entirety herein.

FIELD OF TECHNOLOGY

The following relates to wireless communications, including code block group (CBG) based cross-bandwidth part (BWP) scheduling.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support code block group (CBG) based cross-bandwidth part (BWP) scheduling. Generally, the described techniques provide for cross-BWP transmissions from a base station. The transmissions may be organized into CBGs to facilitate CBG-level feedback from a user equipment (UE). The base station may transmit a CBG-based mapping that indicates how the CBGs of a transport block (TB) are mapped across the multiple BWPs. In some cases, a UE may monitor a downlink control channel for control signaling, which may include scheduling information and a cross-BWP CBG mapping for a TB. For example, the UE may determine that individual CBGs are mapped across different BWPs based on the cross-BWP CBG mapping. Additionally or alternatively, the UE may determine that each CBG is mapped within one BWP based on the cross-BWP CBG mapping. In some examples, the UE may calculate a size of the TB based on available time and frequency resources. The TB size may be calculated for each BWP, or for all BWPs collectively. The UE may decode the TB based on calculating the TB size and the cross-BWP CBG mapping. Upon decoding the TB and determining which CBGs are correctly decoded, the UE may transmit a feedback message to the base station indicating feedback on a per CBG level. CBG retransmission may be over BWPs that had lower failure rates.

A method for wireless communications at a UE is described. The method may include receiving downlink control information (DCI) scheduling a downlink transmission from a base station to the UE across a set of multiple BWPs, receiving an indication of a CBG mapping for the downlink transmission, where a TB of the downlink transmission includes multiple CBGs that are mapped across the set of multiple BWPs in accordance with the CBG mapping, and monitoring for the TB across the set of multiple BWPs in accordance with the CBG mapping.

An apparatus for wireless communications at a UE is described. The apparatus may include a processor, memory coupled with the processor, and instructions stored in the memory. The instructions may be executable by the processor to cause the apparatus to receive DCI scheduling a downlink transmission from a base station to the UE across a set of multiple BWPs, receive an indication of a CBG mapping for the downlink transmission, where a TB of the downlink transmission includes multiple CBGs that are mapped across the set of multiple BWPs in accordance with the CBG mapping, and monitor for the TB across the set of multiple BWPs in accordance with the CBG mapping.

Another apparatus for wireless communications at a UE is described. The apparatus may include means for receiving DCI scheduling a downlink transmission from a base station to the UE across a set of multiple BWPs, means for receiving an indication of a CBG mapping for the downlink transmission, where a TB of the downlink transmission includes multiple CBGs that are mapped across the set of multiple BWPs in accordance with the CBG mapping, and means for monitoring for the TB across the set of multiple BWPs in accordance with the CBG mapping.

A non-transitory computer-readable medium storing code for wireless communications at a UE is described. The code may include instructions executable by a processor to receive DCI scheduling a downlink transmission from a base station to the UE across a set of multiple BWPs, receive an indication of a CBG mapping for the downlink transmission, where a TB of the downlink transmission includes multiple CBGs that are mapped across the set of multiple BWPs in accordance with the CBG mapping, and monitor for the TB across the set of multiple BWPs in accordance with the CBG mapping.

In some examples of the method, apparatuses, and non-transitory computer-readable medium described herein, monitoring for the TB may include operations, features, means, or instructions for monitoring for at least one CBG that may be split across at least two BWPs of the set of multiple BWPs in accordance with the CBG mapping.

In some examples of the method, apparatuses, and non-transitory computer-readable medium described herein, monitoring for the TB may include operations, features, means, or instructions for monitoring for at least a first CBG that may be completely contained within a first BWP and at least a second CBG that may be completely contained within a second BWP, in accordance with the CBG mapping.

In some examples of the method, apparatuses, and non-transitory computer-readable medium described herein, a first modulation and coding scheme (MCS) of the first CBG and a second MCS of the second CBG differ.

Some examples of the method, apparatuses, and non-transitory computer-readable medium described herein may further include operations, features, means, or instructions for attempting to decode the TB based on the CBG mapping and transmitting a feedback message that provides CBG-level feedback for an initial transmission based on whether respective CBGs were decoded successfully during the initial transmission.

Some examples of the method, apparatuses, and non-transitory computer-readable medium described herein may further include operations, features, means, or instructions for monitoring for a retransmission of one or more CBGs of the multiple CBGs in response to the feedback message, where the UE monitors for at least one of the one or more CBGs of the retransmission on a second BWP different from a first BWP on which the UE monitored for the at least one of the one or more CBGs of the initial transmission.

In some examples of the method, apparatuses, and non-transitory computer-readable medium described herein, the second BWP may be associated with a higher rate of successful decoding of CBGs during the initial transmission than the first BWP.

Some examples of the method, apparatuses, and non-transitory computer-readable medium described herein may further include operations, features, means, or instructions for determining to monitor the second BWP for retransmission of the at least one of the one or more CBGs based on the second BWP being associated with a higher rate of successful decoding of CBGs during the initial transmission than the first BWP.

Some examples of the method, apparatuses, and non-transitory computer-readable medium described herein may further include operations, features, means, or instructions for calculating a size of the TB for each BWP of the set of multiple BWPs and calculating a maximum number of CBGs for each BWP of the set of multiple BWPs.

Some examples of the method, apparatuses, and non-transitory computer-readable medium described herein may further include operations, features, means, or instructions for calculating a BWP-based size of the TB for each BWP of the set of multiple BWPs, determining a TB size based on a sum of each of the BWP-based sizes, and calculating a maximum number of CBGs for the set of multiple BWPs based on available resources across all of the set of multiple BWPs.

A method for wireless communications at a base station is described. The method may include transmitting DCI scheduling a downlink transmission from the base station to a UE across a set of multiple BWPs, transmitting, to the UE, an indication of a CBG mapping for the downlink transmission, where a TB of the downlink transmission includes multiple CBGs that are mapped across the set of multiple BWPs in accordance with the CBG mapping, and transmitting, to the UE, the TB across the set of multiple BWPs in accordance with the CBG mapping.

An apparatus for wireless communications at a base station is described. The apparatus may include a processor, memory coupled with the processor, and instructions stored in the memory. The instructions may be executable by the processor to cause the apparatus to transmit DCI scheduling a downlink transmission from the base station to a UE across a set of multiple BWPs, transmit, to the UE, an indication of a CBG mapping for the downlink transmission, where a TB of the downlink transmission includes multiple CBGs that are mapped across the set of multiple BWPs in accordance with the CBG mapping, and transmit, to the UE, the TB across the set of multiple BWPs in accordance with the CBG mapping.

Another apparatus for wireless communications at a base station is described. The apparatus may include means for transmitting DCI scheduling a downlink transmission from the base station to a UE across a set of multiple BWPs, means for transmitting, to the UE, an indication of a CBG mapping for the downlink transmission, where a TB of the downlink transmission includes multiple CBGs that are mapped across the set of multiple BWPs in accordance with the CBG mapping, and means for transmitting, to the UE, the TB across the set of multiple BWPs in accordance with the CBG mapping.

A non-transitory computer-readable medium storing code for wireless communications at a base station is described. The code may include instructions executable by a processor to transmit DCI scheduling a downlink transmission from the base station to a UE across a set of multiple BWPs, transmit, to the UE, an indication of a CBG mapping for the downlink transmission, where a TB of the downlink transmission includes multiple CBGs that are mapped across the set of multiple BWPs in accordance with the CBG mapping, and transmit, to the UE, the TB across the set of multiple BWPs in accordance with the CBG mapping.

In some examples of the method, apparatuses, and non-transitory computer-readable medium described herein, transmitting the TB may include operations, features, means, or instructions for transmitting at least one CBG that may be split across at least two BWPs of the set of multiple BWPs in accordance with the CBG mapping.

In some examples of the method, apparatuses, and non-transitory computer-readable medium described herein, transmitting the TB may include operations, features, means, or instructions for transmitting at least a first CBG that may be completely contained within a first BWP and at least a second CBG that may be completely contained within a second BWP, in accordance with the CBG mapping.

In some examples of the method, apparatuses, and non-transitory computer-readable medium described herein, a first MCS of the first CBG and a second MCS of the second CBG differ.

Some examples of the method, apparatuses, and non-transitory computer-readable medium described herein may further include operations, features, means, or instructions for encoding the TB based on the CBG mapping and receiving, from the UE, a feedback message that provides CBG-level feedback for an initial transmission based on whether respective CBGs were decoded successfully at the UE during the initial transmission.

Some examples of the method, apparatuses, and non-transitory computer-readable medium described herein may further include operations, features, means, or instructions for transmitting, to the UE, a retransmission of one or more CBGs of the multiple CBGs in response to the feedback message, where at least one of the one or more CBGs may be transmitted via the retransmission on a second BWP different from a first BWP on which the at least one of the one or more CBGs was transmitted via the initial transmission.

In some examples of the method, apparatuses, and non-transitory computer-readable medium described herein, the second BWP may be associated with a higher rate of successful decoding of CBGs during the initial transmission than the first BWP.

Some examples of the method, apparatuses, and non-transitory computer-readable medium described herein may further include operations, features, means, or instructions for transmitting the retransmission of the at least one of the one or more CBGs on the second BWP based on the second BWP being associated with a higher rate of successful decoding of CBGs during the initial transmission than the first BWP.

BRIEF DESCRIPTION OF THE DRAWINGS

FIGS. 1 and 2 illustrate examples of wireless communications systems that support code block group (CBG) based cross-bandwidth part (BWP) scheduling in accordance with aspects of the present disclosure.

FIG. 11 shows a block diagram of a communications manager that supports code block group based cross-bandwidth part scheduling in accordance with aspects of the present disclosure.

FIGS. 13 through 17 show flowcharts illustrating methods that support code block group based cross-bandwidth part scheduling in accordance with aspects of the present disclosure.

DETAILED DESCRIPTION

In some wireless communications systems, a user equipment (UE) may communicate with one or more other devices (e.g., a base station, another UE, or the like) in a full duplex communication mode. In doing so, the UE may communicate over bandwidth parts (BWPs) that are configured for either uplink or downlink transmission. In some cases, a full duplex UE may be configured with multiple downlink BWPs with an intervening uplink BWP. For example, two downlink BWPs may be allocated with an uplink BWP in between the two downlink BWPs. Thus, cross-BWP scheduling may be useful to schedule a downlink transmission across multiple disconnected BWPs. A transport block (TB) of a downlink transmission may be encoded into code blocks and code block groups (CBGs). However, in order to receive a TB that is encoded into code blocks and CBGs across multiple BWPs, the UE may receive a configuration that identifies a mapping for a cross-BWP-scheduled TB with CBGs across different BWPs.

As described herein, a base station may transmit an indication of a CBG mapping for a TB across multiple BWPs to a UE. In some cases, the CBGs may be mapped across different BWPs (e.g., each CBG is mapped across two BWPs). In some other cases, each CBG may be mapped to one BWP, and the mapping may indicate the association between individual CBGs and BWPs. The UE may calculate the TB size based on available time and frequency resources, which may be determined on a per-BWP basis or by considering the downlink BWPs together. In some examples, the UE may decode the TB and may determine the correctly decoded CBGs. Upon decoding the TB, the UE may transmit a feedback message indicating which CBGs were decoded correctly. The base station may then send CBG-based retransmissions (e.g., responsive to a negative acknowledgment (NACK)) in BWPs based on a per-BWP likelihood for successful decoding. That is, if the failed CBGs were originally transmitted in a given BWP, then the retransmission of those CBGs may be in a different BWP that may be associated with fewer NACKs.

Decoding the TB may also involve calculating a size of the TB. In some examples, the UE may calculate a size of the TB based on available time and frequency resources. The TB size may be calculated for individual downlink BWPs, or for all downlink BWPs collectively.

Aspects of the disclosure are initially described in the context of wireless communications systems. Aspects of the disclosure are further described in the context of resource diagrams and a process flow. Aspects of the disclosure are further illustrated by and described with reference to apparatus diagrams, system diagrams, and flowcharts that relate to code block group based cross-bandwidth part scheduling.

Figure 1:
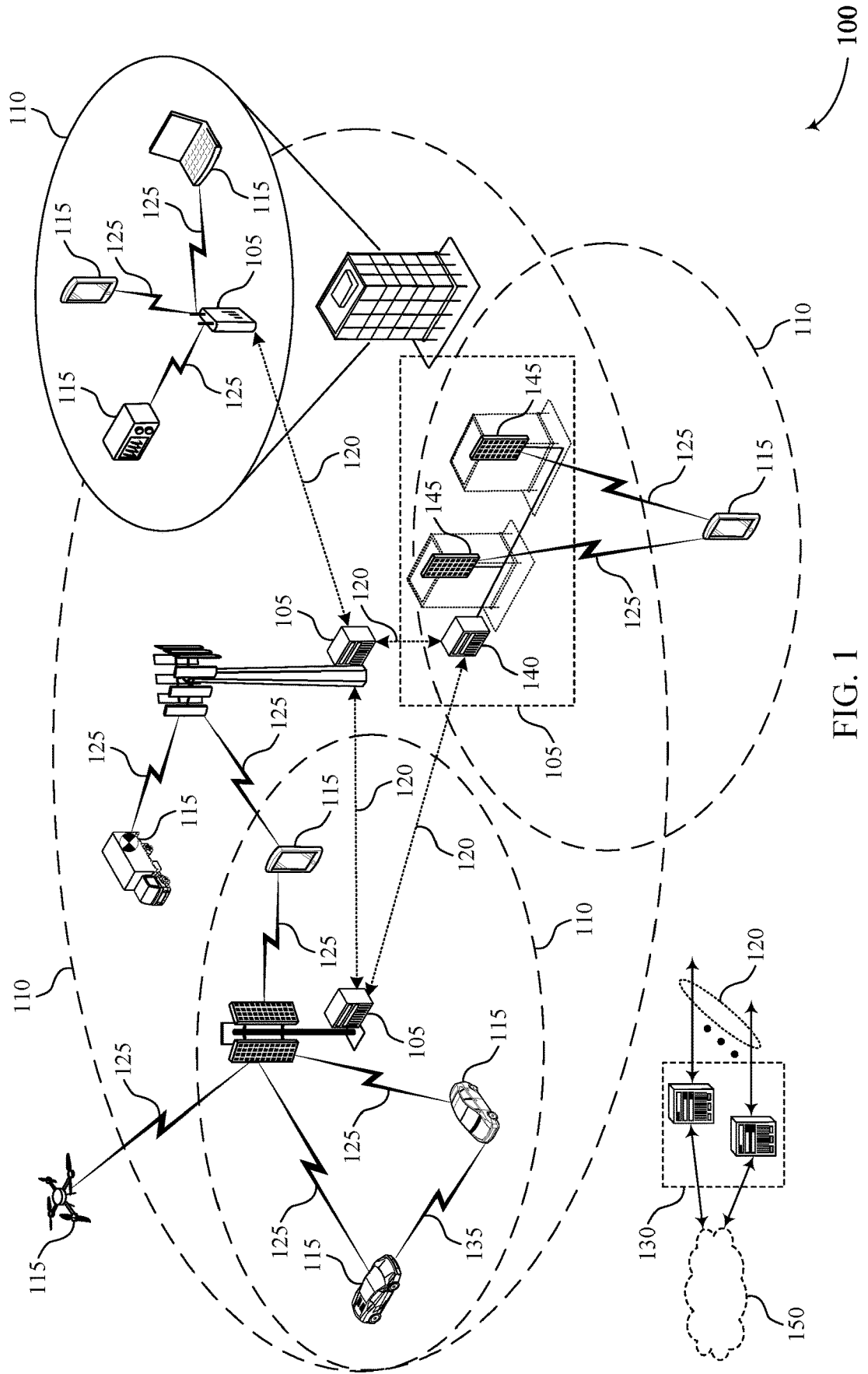

FIG. 1 illustrates an example of a wireless communications system 100 that supports CBG based cross-BWP scheduling in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a BWP) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, a base station 105, a UE 115, or both, may transmit data or control signaling in a BWP, which may be a contiguous set of physical resource blocks (PRBs) on a carrier. In cross-BWP scheduling, the UE 115, may receive control signaling (e.g., a downlink control information (DCI)) message in a BWP that schedules a downlink or uplink data reception or transmission, respectively, that spans two or more BWPs. For example, the base station 105 may schedule one or more CBGs of a TB across multiple BWPs. However, the UE may not be aware of the mapping of a TB over the time and frequency resources allocated in each BWP for cross-BWP operation, which may impact the ability of UE 115 to decode the TB and provide feedback related to the CBGs in the TB.

In some examples, a CBG-based mapping may be introduced to facilitate feedback information as well as to indicate mapping of the TB across the multiple BWPs. In some cases, a UE 115 may monitor a downlink control channel for control signaling, which may include scheduling information and a cross-BWP CBG mapping for a TB. Once the UE 115 receives the cross-BWP CBG mapping, the UE 115 may apply the cross-BWP CBG mapping to a TB. For example, the UE 115 may determine the CBGs may be mapped across different BWPs based on the cross-BWP CBG mapping, which is described in further detail with respect to FIG. 3A. Additionally or alternatively, the UE 115 may determine each CBG may be mapped within one BWP based on the cross-BWP CBG mapping, which is described in further detail with respect to FIG. 3B. In some examples, the UE 115 may calculate a size of the TB (e.g., a number of time and frequency resources as well as CBGs included in the TB) based on available time and frequency resources. The TB size may be calculated for each BWP, or for all BWPs collectively. The UE 115 may decode the TB based on calculating the TB size and the cross-BWP CBG mapping. Upon decoding the TB and determining which CBGs are correctly decoded, the UE 115 may transmit a feedback message to the base station 105 indicating feedback on a per CBG level.

FIG. 2 illustrates an example of a wireless communications system 200 that supports CBG based cross-BWP scheduling in accordance with aspects of the present disclosure. In some examples, wireless communications system 200 may implement aspects of wireless communication system 100 and may include UE 115-a and base station 105-a with coverage area 110-a, which may be examples of a UE 115 and a base station 105 with a coverage area 110 as described with reference to FIG. 1. In some examples, base station 105-a and UE 115-a may communicate control signaling, data, or both using downlink communication link 205 and uplink communication link 210. For example, base station 105-a may transmit one or more CBGs 215 of a TB 220 across multiple BWPs to UE 115-a using downlink communication link 205. Similarly, UE 115-a may communicate feedback information to base station 105-a via uplink communication link 210.

In some examples, a UE 115 may communicate with one or more other devices (e.g., a base station 105, another UE 115, or the like) in a full duplex communication mode. For example, UE 115-a, base station 105-a, or both may communicate according to a full duplex communication mode. In some cases, base station 105-a may communicate in a full duplex mode, while UE 115-a may communicate in a half-duplex mode, which may cause self-interference from downlink to uplink at base station 105-a due to base station 105-*a* transmitting and receiving on the same time and frequency resource. In some other cases, UE 115-*a* and base station 105-*a* may both communicate in a full duplex mode, which may cause self-interference from uplink to downlink at UE 115-*a* due to UE 115-*a* transmitting and receiving on the same time and frequency resource. In some cases, UE 115-*a* may communicate in a full duplex mode with one or more base stations 105 or multiple TRPs, which may be examples of base stations 105, relays, or the like.

In some examples, UE 115-*a* and base station 105-*a* may operate according to one or more full duplex communication modes. For example, in-band full duplex operation may involve UE 115-*a*, base station 105-*a*, or both transmitting and receiving on the same time and frequency resource. Thus, a downlink resource for reception and an uplink resource for transmission may share a same in-band full duplex time and frequency resource, which may fully or partially overlap. In some other cases, in sub-band frequency division duplex (FDD) operation, UE 115-*a*, base station 105-*a*, or both may transmit and receive at the same time but on a different frequency resource. Thus, a downlink resource for reception may be separated from an uplink resource for transmission in the frequency domain. The downlink resource and the uplink resource may be separated by a guard band, which may include any number of frequency resources.

In some cases, a base station 105, the UE 115, or both, may transmit data or control signaling in a BWP, which may be a contiguous set of physical resource blocks (PRBs) on a carrier. In cross-BWP scheduling, the UE 115, such as UE 115-*a*, may receive control signaling (e.g., a DCI) message in a BWP that schedules a downlink or uplink data reception or transmission, respectively, that spans two or more BWPs. For example, the DCI message may include one or more scheduling grants that span multiple BWPs. The UE 115 may use cross-BWP scheduling when operating in a full duplex mode in which two downlink bands are allocated with an uplink band in between. Additionally or alternatively, the base station 105 may perform cross-BWP scheduling in carrier aggregation.

The base station 105 may schedule a downlink data reception or uplink data transmission in a TB 220, which may include one or more code blocks 225. For example, base station 105-*a* may schedule a downlink data reception at UE 115-*a* for the TB 220, which may include multiple code blocks 225. In some cases, if the UE 115 fails to receive one of the code blocks 225 in the TB 220, the UE 115 may report a NACK for the TB 220. The base station 105 may retransmit the TB 220, which may introduce inefficiency related to unnecessarily retransmitting one or more successful code blocks 225 (e.g., if a portion of the code blocks 225 in the TB 220 fails). Thus, to increase HARQ efficiency, the UE 115 or the base station 105 may divide the code blocks 225 into CBGs 215. For example, base station 105-*a* may transmit a portion of the TB 220 in CBG 215-*a* and another portion of the TB 220 in CBG 215-*b*. Although CBG 215-*a* and CBG 215-*b* are shown to include 5 code blocks 225, the CBGs 215 may include any number of code blocks 225, and the TB 220 may include any number of CBGs 215. The UE 115 may transmit an ACK or a NACK for each CBG 215 in the TB 220 (e.g., for CBG 215-*a* and CBG 215-*b*).

In some examples, the base station 105 may schedule the CBGs 215 in a TB 220 across multiple BWPs to facilitate the process of full-duplex communications. Additionally or alternatively, the base station 105 may schedule CBGs 215 across multiple BWPs in a cross-carrier scheduling procedure. However, the UE may not be aware of the mapping of a TB 220 over the time and frequency resources allocated in each BWP for cross-BWP operation, which may impact feedback related to the CBGs 215 in the TB 220.

In some examples, a CBG-based mapping may be introduced to facilitate feedback information (e.g., a HARQ process) as well as mapping the TB 220 across the multiple BWPs. In some cases, a UE 115, such as UE 115-*a*, may monitor one or more channels for signaling from base station 105-*a*. For example, UE 115-*a* may monitor multiple downlink control channels (e.g., a physical downlink control channel (PDCCH)) for one or more messages scheduling transmissions on downlink shared channels (e.g., a physical downlink shared channel (PDSCH)). The PDCCH may carry control signaling 230, which may include scheduling information 235 and a cross-BWP CBG mapping 240 for a TB 220. For example, UE 115-*a* may monitor the PDCCH and receive a DCI message, a MAC-CE, RRC signaling, or the like from base station 105-*a* including the scheduling information 235 and the cross-BWP CBG mapping 240.

In some examples, UE 115-*a* may indicate a capability of UE 115-*a* to perform cross-BWP CBG mapping to base station 105-*a* via uplink communication link 210. Base station 105-*a* may include the cross-BWP CBG mapping 240 based on receiving a message from UE 115-*a* indicating the UE capability. Once UE 115-*a* receives the cross-BWP CBG mapping 240 (e.g., for cross-BWP scheduling), UE 115-*a* may apply the cross-BWP CBG mapping 240 to a TB 220. For example, at 245, UE 115-*a* may monitor for the TB 220 across multiple BWPs based on the cross-BWP CBG mapping 240. In some cases, the UE 115 may determine the CBGs 215 may be mapped across different BWPs based on the cross-BWP CBG mapping 240, which is described in further detail with respect to FIG. 3A. Additionally or alternatively, the UE 115 may determine each CBG 215 may be mapped within one BWP based on the cross-BWP CBG mapping 240, which is described in further detail with respect to FIG. 3B.

In some examples, UE 115-*a* may calculate a size of the TB 220 (e.g., a number of time and frequency resources as well as CBGs 215 included in the TB 220) based on available time and frequency resources. For example, if the TB 220 is mapped across two BWPs, UE 115-*a* may calculate the TB size and number of CBGs 215 based on each BWP independently. That is, UE 115-*a* may calculate the number of CBGs 215 separately for each BWP. In some other examples, UE 115-*a* may calculate a TB size by adding together the number of available resources on each BWP and may calculate the number of CBGs 215 based on the total number of available resources.

In some cases, UE 115-*a* may decode the TB 220 based on calculating the TB size and the cross-BWP CBG mapping 240. For example, UE 115-*a* may decode CBG 215-*a* and CBG 215-*b* correctly based on cross-BWP CBG mapping 240. In some other examples, UE 115-*a* may decode a CBG 215 of the TB 220 unsuccessfully. Upon decoding the TB 220 and determining the correctly decoded CBGs 215, UE 115-*a* may transmit a feedback message 250 to base station 105-*a* via uplink communication link 210. The feedback message 250 may be a HARQ message indicating an ACK or a NACK for each CBG 215 (e.g., on a per CBG level). For example, if UE 115-*a* successfully decodes CBG 215-*a* and CBG 215-*b*, UE 115-*a* may transmit an ACK for both CBGs 215. However, if UE 115-*a* unsuccessfully decodes CBG 215-*a*, CBG 215-*b*, or both, UE 115-*a* may transmit a NACK for whichever CBG 215 UE 115-*a* decoded unsuccessfully. Thus, the network or base station 105-*a* may know through the HARQ-ACK which CBGs 215 were decoded correctly.

Base station 105-*a* may compare the number of CBGs 215 UE 115-*a* decoded successfully on each BWP to determine which BWPs to prioritize for retransmissions. For example, base station 105-*a* may prioritize a BWP in which UE 115-*a* successfully decoded more CBGs 215 than another BWP, which is described in further detail with respect to FIGS. 3A and 3B. Additionally or alternatively, UE 115-*a* may implicitly determine the resources for the retransmission based on a number of CBGs 215 decoded unsuccessfully on each BWP (e.g., a BWP with the least number of failed CBGs 215).

Figures 3A, 3B:
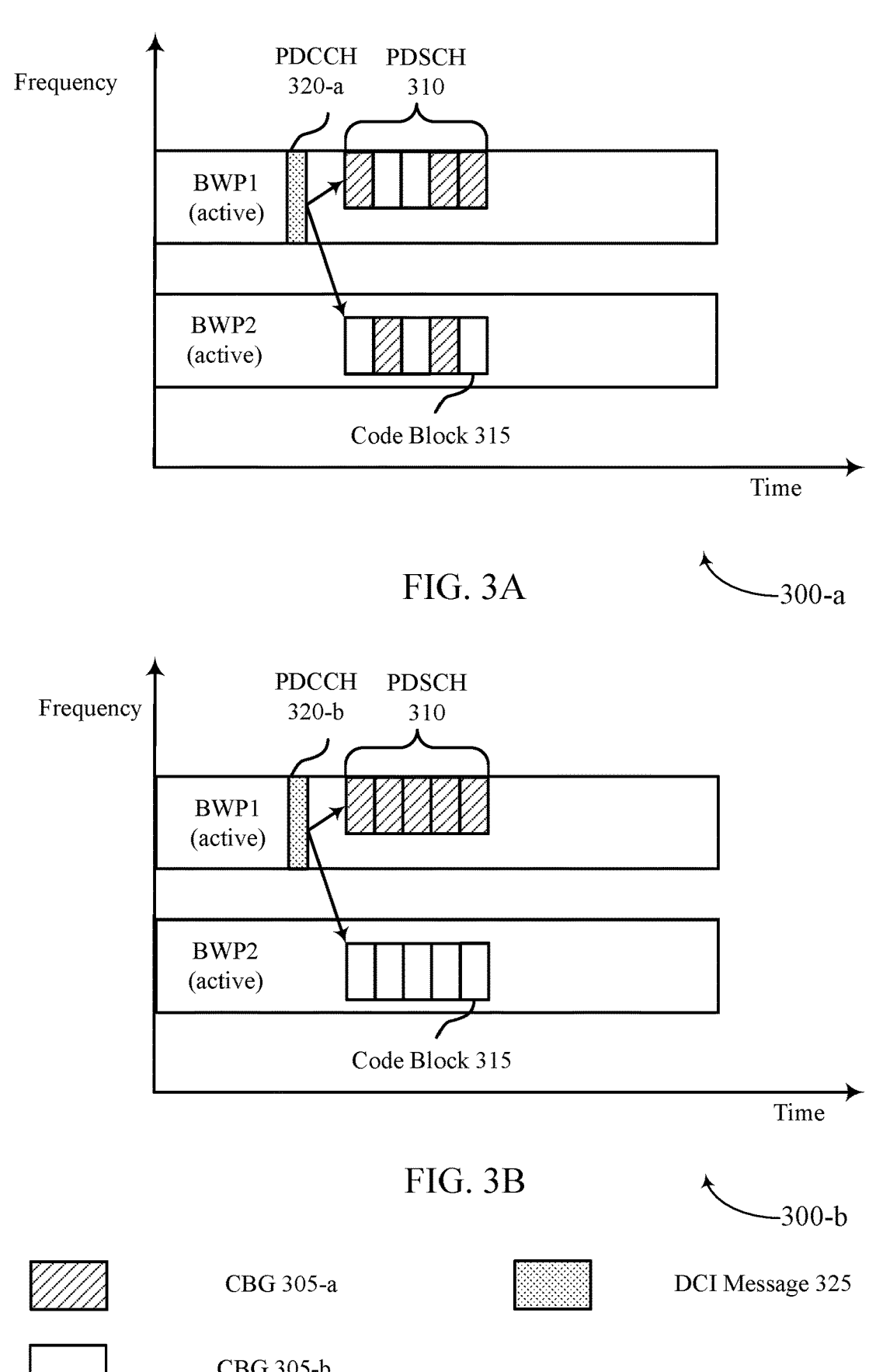
FIGS. 3A and 3B illustrate examples of resource diagrams that support code block group based cross-bandwidth part scheduling in accordance with aspects of the present disclosure.

FIGS. 3A and 3B illustrate examples of resource diagrams 300-*a* and 300-*b* that support CBG based cross-BWP scheduling in accordance with aspects of the present disclosure. In some examples, resource diagram 300-*a* and resource diagram 300-*b* may implement aspects of wireless communication system 100 and wireless communications system 200. For example, resource diagrams 300-*a* and resource diagram 300-*b* may be implemented by a UE 115 and a base station 105 as described with reference to FIGS. 1 and 2. In some cases, a base station may transmit control signaling to a UE including scheduling information for a TB including one or more CBGs 305 and a cross-BWP CBG mapping for one or more active BWPs (e.g., active frequency resources), such as BWP1 and BWP2. In some examples, as illustrated in FIG. 3A, the base station may transmit one or more CBGs 305 across different BWPs. For example, a given CBG 305-*a* may be included in both BWP1 and BWP2. CBG 305-*b* may also be included in both BWP1 and BWP2. In some other examples, as illustrated in FIG. 3B, the UE may transmit one or more CBGs 305 within a same BWP. For example, CBG 305-*a* may be wholly within BWP1, while CBG 305-*b* may be wholly within BWP2.

In some cases, a base station may transmit one or more data packets of a data message in a TB to a UE on a PDSCH 310 of one or more BWPs. The base station may divide the TB into one or more CBGs 305, such as CBG 305-*a* and CBG 305-*b*. Each CBG may include any number of code blocks 315. The base station may transmit the CBGs across multiple active BWPs (e.g., frequency resources), such as BWP1 and BWP2. A network, or the base station, may determine which code blocks 315 or CBGs 305 to include in each BWP. The base station may indicate to the UE a cross-BWP CBG mapping for the one or more CBGs 305, such as CBG 305-*a* and CBG 305-*b*. For example, the base station may transmit control signaling on a PDCCH 320 of an active BWP (e.g., BWP1) including the cross-BWP CBG mapping. The control signaling may be a DCI message 325 with one or more bits indicating the cross-BWP CBG mapping. The cross-BWP CBG mapping may provide the UE with information to monitor for and decode CBG 305-*a* and CBG 305-*b*.

In some cases, the UE may determine the CBGs 305 may be mapped across different BWPs based on the cross-BWP CBG mapping. That is, to improve frequency diversity in a CBG 305, the base station may map a CBG 305 across multiple BWPs. For example, as illustrated in resource diagram 300-*a*, the UE may receive an indication of a cross-BWP CBG mapping from the base station that maps one or more code blocks 315 of CBG 305-*a* to BWP1 and one or more other code blocks 315 of CBG 305-*a* to BWP2. The UE may receive the cross-BWP CBG mapping on PDCCH 320-*a* (e.g., via a DCI message). Similarly, the cross-BWP CBG mapping may map one or more code blocks 315 of CBG 305-*b* to BWP1 and one or more other code block 315 of CBG 305-*b* to BWP2.

Additionally or alternatively, the UE may determine each CBG 305 may be mapped within one BWP based on the cross-BWP CBG mapping. That is, to keep different CBGs 305 within one BWP, the base station may map a CBG 305 with a relatively small modulation and coding scheme (MCS) within one BWP and another CBG 305 with a relatively large MCS within a different BWP. The CBGs 305 with a relatively large MCS may be mapped within a BWP based on a BWP configuration and a channel condition (e.g., that supports the higher MCS). For example, as illustrated in resource diagram 300-*b*, the UE may receive an indication of a cross-BWP CBG mapping from the base station that maps the code blocks 315 of CBG 305-*a* to BWP1 and the code blocks 315 of CBG 305-*b* to BWP2 (e.g., because an MCS for CBG 305-*a* and an MCS for CBG 305-*b* may differ in value). The UE may receive the cross-BWP CBG mapping on PDCCH 320-*b* (e.g., via a DCI message).

In some cases, the UE may decode the TB based on calculating a TB size and the cross-BWP CBG mapping. The UE may decode a CBG 305 successfully or unsuccessfully and may transmit a feedback message to the base station accordingly. For example, if the UE successfully decodes CBG 305-*a* and unsuccessfully decodes CBG 305-*b*, the UE may transmit an ACK for CBG 305-*a* and a NACK for CBG 305-*b*. The base station may compare the number of CBGs 305 the UE decoded successfully on each BWP to determine which BWPs to prioritize for retransmissions. For example, the base station may prioritize BWP1 for retransmissions of CBG 305-*b* (e.g., if the UE transmits a NACK for CBG 305-*b*).

Figure 4:
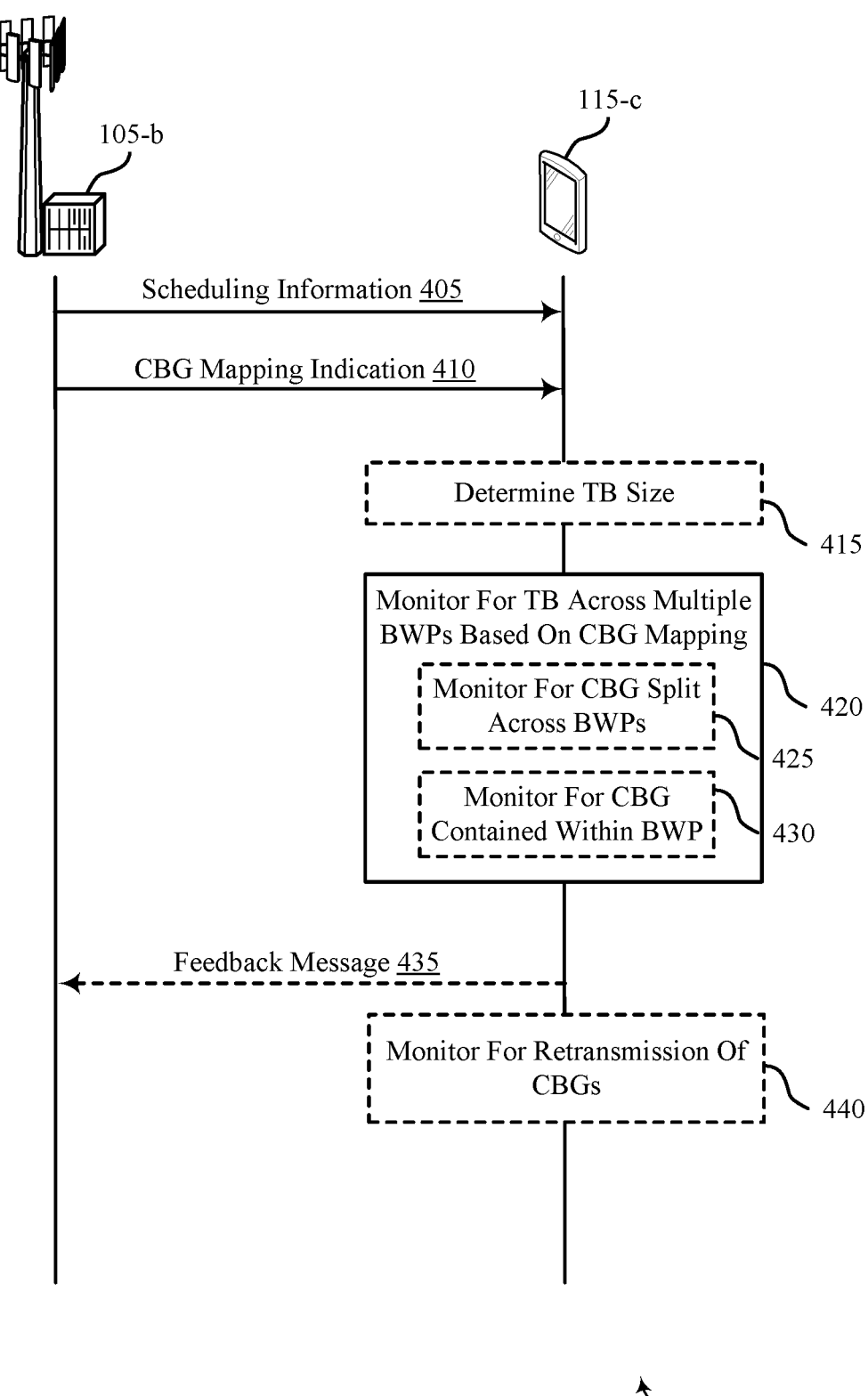
FIG. 4 illustrates an example of a process flow that supports code block group based cross-bandwidth part scheduling in accordance with aspects of the present disclosure.

FIG. 4 illustrates an example of a process flow 400 that supports CBG based cross-BWP scheduling in accordance with aspects of the present disclosure. In some examples, process flow 400 may implement aspects of wireless communications system 100, wireless communication system 200, and resource diagrams 300. The process flow 400 may illustrate an example of a base station 105-*b* transmitting scheduling information and a CBG mapping for a TB to UE 115-*b* for cross-BWP communications. Alternative examples of the following may be implemented, where some processes are performed in a different order than described or are not performed. In some cases, processes may include additional features not mentioned below, or further processes may be added.

At 405, base station 105-*b* may transmit scheduling information in control singling (e.g., a DCI message) for a downlink transmission from base station 105-*b* to UE 115-*b* across multiple BWPs.

At 410, base station 105-*b* may transmit an indication of a CBG mapping for the downlink transmission. A TB of the downlink transmission may include multiple CBGs that are mapped across the multiple BWPs based on the CBG mapping. In some examples, base station 105-*b* may include the indication of the CBG mapping in the DCI. In some other examples, base station 105-*b* may include the indication of the CBG mapping in additional control signaling. UE 115-*b* may transmit a UE capability message to base station 105-*b* indicating a capability to decode CBGs across multiple BWPs. Base station 105-*b* may transmit the indication of the CBG mapping based on receiving the capability message.

At 415, UE 115-*b* may calculate a size of the TB for each BWP containing code blocks from CBGs. In some cases, UE 115-*b* may calculate a maximum number of CBGs for each BWP. In some other cases, UE 115-*b* may calculate a BWP-based size of the TB for each BWP to determine a TB size based on a sum of each of the BWP-based sizes. UE 115-*b* may calculate a maximum number of CBGs for the BWPs based on available resources across the BWPs.

At 420, UE 115-*b* may monitor for the TB across the BWPs in accordance with the CBG mapping.

At 425, for example, UE 115-*b* may monitor for a CBG that may be split across BWPs. That is, UE 115-*b* may monitor for at least one CBG that may be split across at least two BWPs based on the CBG mapping.

At 430, UE 115-*b* may monitor for a CBG contained within a BWP. That is, UE 115-*b* may monitor for at least a first CBG that is completely contained within a first BWP and at least a second CBG that is completely contained within a second BWP based on the code block group mapping. In some examples, an MCS of the first CBG and an MCS of the second code block group may differ. For example, the CBGs may be mapped to BWPs based on an MCS value, such that CBGs with relatively high MCS values may be contained within a BWP while CBGs with relatively low MCS values may be contained within a different BWP.

In some examples, UE 115-*b* may attempt to decode the TB based on the CBG mapping. At 435, UE 115-*b* may transmit a feedback message that provides CBG-level feedback for an initial transmission based on whether respective CBGs were decoded successfully during the initial transmission.

At 440, UE 115-*b* may monitor for a retransmission of one or more CBGs in response to the feedback message, where the UE monitors for at least one CBG of the retransmission on a BWP different from another BWP on which the UE monitored for the CBGs of the initial transmission. In some cases, the BWP may have a higher rate of successful decoding of CBGs during the initial transmission than the other BWP. UE 115-*b* may monitor the BWP for the retransmission of the CBG based on the BWP being associated with a higher rate of successful decoding of CBGs during the initial transmission than the other BWP.

Figure 5:
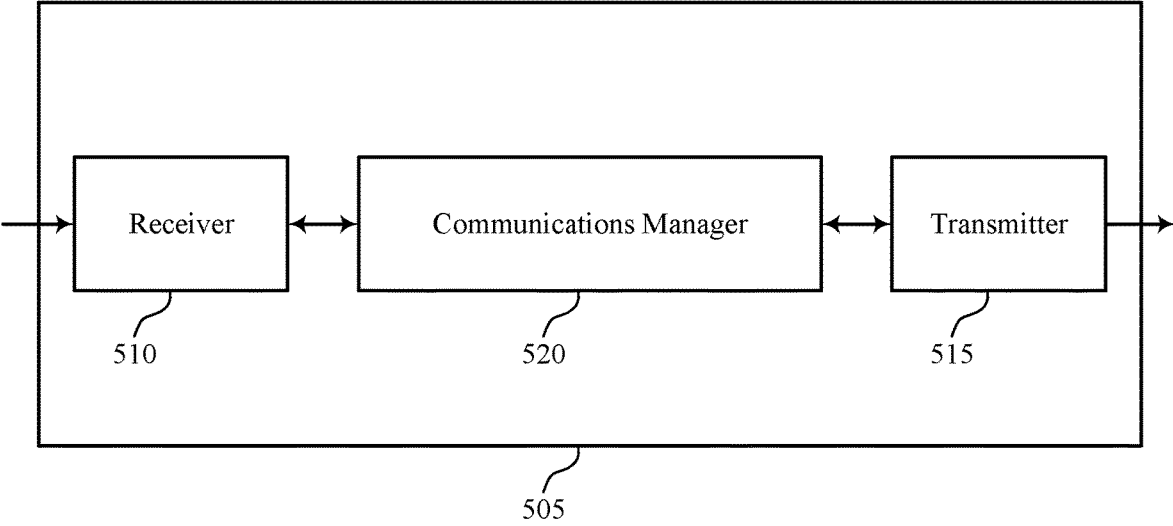
FIGS. 5 and 6 show block diagrams of devices that support code block group based cross-bandwidth part scheduling in accordance with aspects of the present disclosure.

FIG. 5 shows a block diagram 500 of a device 505 that supports CBG based cross-BWP scheduling in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to CBG based cross-BWP scheduling). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to CBG based cross-BWP scheduling). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for perform-ing various aspects of CBG based cross-BWP scheduling as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. For example, the communications manager 520 may be configured as or otherwise support a means for receiving DCI scheduling a downlink transmission from a base station to the UE across a set of multiple BWPs. The communications manager 520 may be configured as or otherwise support a means for receiving an indication of a CBG mapping for the downlink transmission, where a TB of the downlink transmission includes multiple CBGs that are mapped across the set of multiple BWPs in accordance with the CBG mapping. The communications manager 520 may be configured as or otherwise support a means for monitoring for the TB across the set of multiple BWPs in accordance with the CBG mapping.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for signaling a CBG mapping across multiple BWPs, which may cause reduced processing, reduced power consumption, more efficient utilization of communication resources, or the like based on reducing unnecessary retransmissions of CBGs and increase usable frequency resources.

Figure 6:
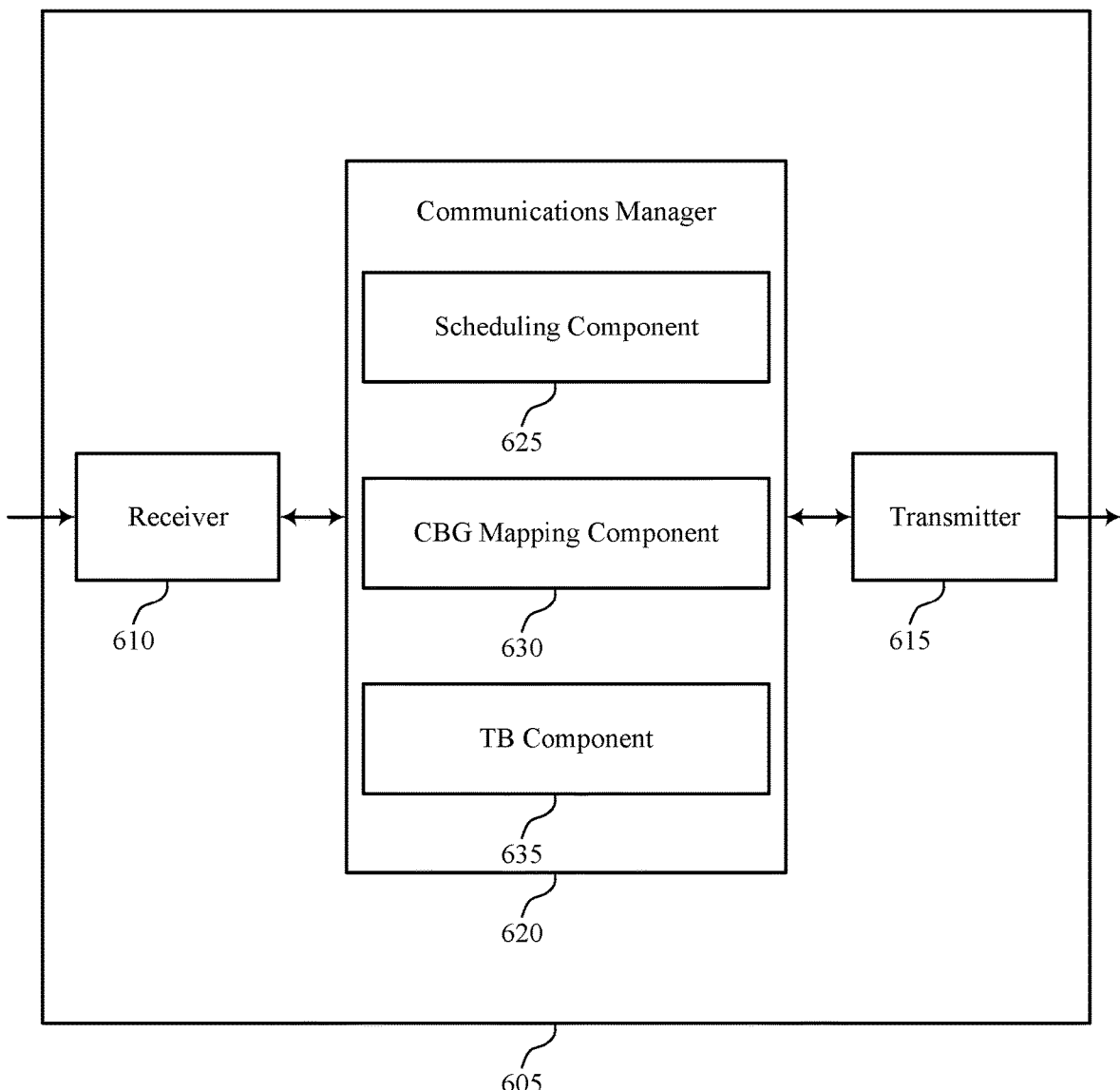

FIG. 6 shows a block diagram 600 of a device 605 that supports CBG based cross-BWP scheduling in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to CBG based cross-BWP scheduling). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to CBG based cross-BWP scheduling). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of CBG based cross-BWP scheduling as described herein. For example, the communications manager 620 may include a scheduling component 625, a CBG mapping component 630, a TB component 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. The scheduling component 625 may be configured as or otherwise support a means for receiving DCI scheduling a downlink transmission from a base station to the UE across a set of multiple BWPs. The CBG mapping component 630 may be configured as or otherwise support a means for receiving an indication of a CBG mapping for the downlink transmission, where a TB of the downlink transmission includes multiple CBGs that are mapped across the set of multiple BWPs in accordance with the CBG mapping. The TB component 635 may be configured as or otherwise support a means for monitoring for the TB across the set of multiple BWPs in accordance with the CBG mapping.

Figure 7:
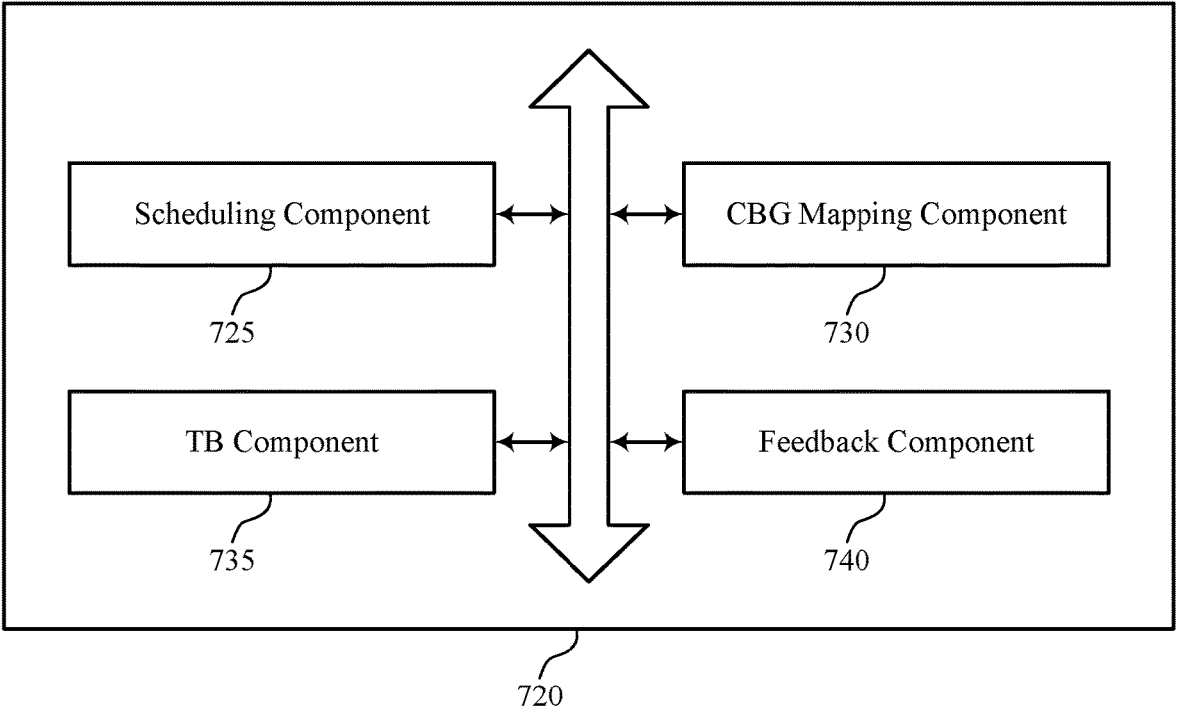
FIG. 7 shows a block diagram of a communications manager that supports code block group based cross-bandwidth part scheduling in accordance with aspects of the present disclosure.

FIG. 7 shows a block diagram 700 of a communications manager 720 that supports CBG based cross-BWP scheduling in accordance with aspects of the present disclosure.

The communications manager 720 may be an example of aspects of a communications manager 520, a communications manager 620, or both, as described herein. The communications manager 720, or various components thereof, may be an example of means for performing various aspects of CBG based cross-BWP scheduling as described herein. For example, the communications manager 720 may include a scheduling component 725, a CBG mapping component 730, a TB component 735, a feedback component 740, or any combination thereof. Each of these components may communicate, directly or indirectly, with one another (e.g., via one or more buses).

The communications manager 720 may support wireless communications at a UE in accordance with examples as disclosed herein. The scheduling component 725 may be configured as or otherwise support a means for receiving DCI scheduling a downlink transmission from a base station to the UE across a set of multiple BWPs. The CBG mapping component 730 may be configured as or otherwise support a means for receiving an indication of a CBG mapping for the downlink transmission, where a TB of the downlink transmission includes multiple CBGs that are mapped across the set of multiple BWPs in accordance with the CBG mapping. The TB component 735 may be configured as or otherwise support a means for monitoring for the TB across the set of multiple BWPs in accordance with the CBG mapping.

In some examples, to support monitoring for the TB, the CBG mapping component 730 may be configured as or otherwise support a means for monitoring for at least one CBG that is split across at least two BWPs of the set of multiple BWPs in accordance with the CBG mapping. In some examples, to support monitoring for the TB, the CBG mapping component 730 may be configured as or otherwise support a means for monitoring for at least a first CBG that is completely contained within a first BWP and at least a second CBG that is completely contained within a second BWP, in accordance with the CBG mapping. In some examples, a first MCS of the first CBG and a second MCS of the second CBG differ.

In some examples, the TB component 735 may be configured as or otherwise support a means for attempting to decode the TB based on the CBG mapping. In some examples, the feedback component 740 may be configured as or otherwise support a means for transmitting a feedback message that provides CBG-level feedback for an initial transmission based on whether respective CBGs were decoded successfully during the initial transmission. In some examples, the CBG mapping component 730 may be configured as or otherwise support a means for monitoring for a retransmission of one or more CBGs of the multiple CBGs in response to the feedback message, where the UE monitors for at least one of the one or more CBGs of the retransmission on a second BWP different from a first BWP on which the UE monitored for the at least one of the one or more CBGs of the initial transmission. In some examples, the second BWP is associated with a higher rate of successful decoding of CBGs during the initial transmission than the first BWP.

In some examples, the CBG mapping component 730 may be configured as or otherwise support a means for determining to monitor the second BWP for retransmission of the at least one of the one or more CBGs based on the second BWP being associated with a higher rate of successful decoding of CBGs during the initial transmission than the first BWP.

In some examples, the TB component 735 may be configured as or otherwise support a means for calculating a size of the TB for each BWP of the set of multiple BWPs. In some examples, the TB component 735 may be configured as or otherwise support a means for calculating a maximum number of CBGs for each BWP of the set of multiple BWPs.

In some examples, the TB component 735 may be configured as or otherwise support a means for calculating a BWP-based size of the TB for each BWP of the set of multiple BWPs. In some examples, the TB component 735 may be configured as or otherwise support a means for determining a TB size based on a sum of each of the BWP-based sizes. In some examples, the TB component 735 may be configured as or otherwise support a means for calculating a maximum number of CBGs for the set of multiple BWPs based on available resources across all of the set of multiple BWPs.

Figure 8:
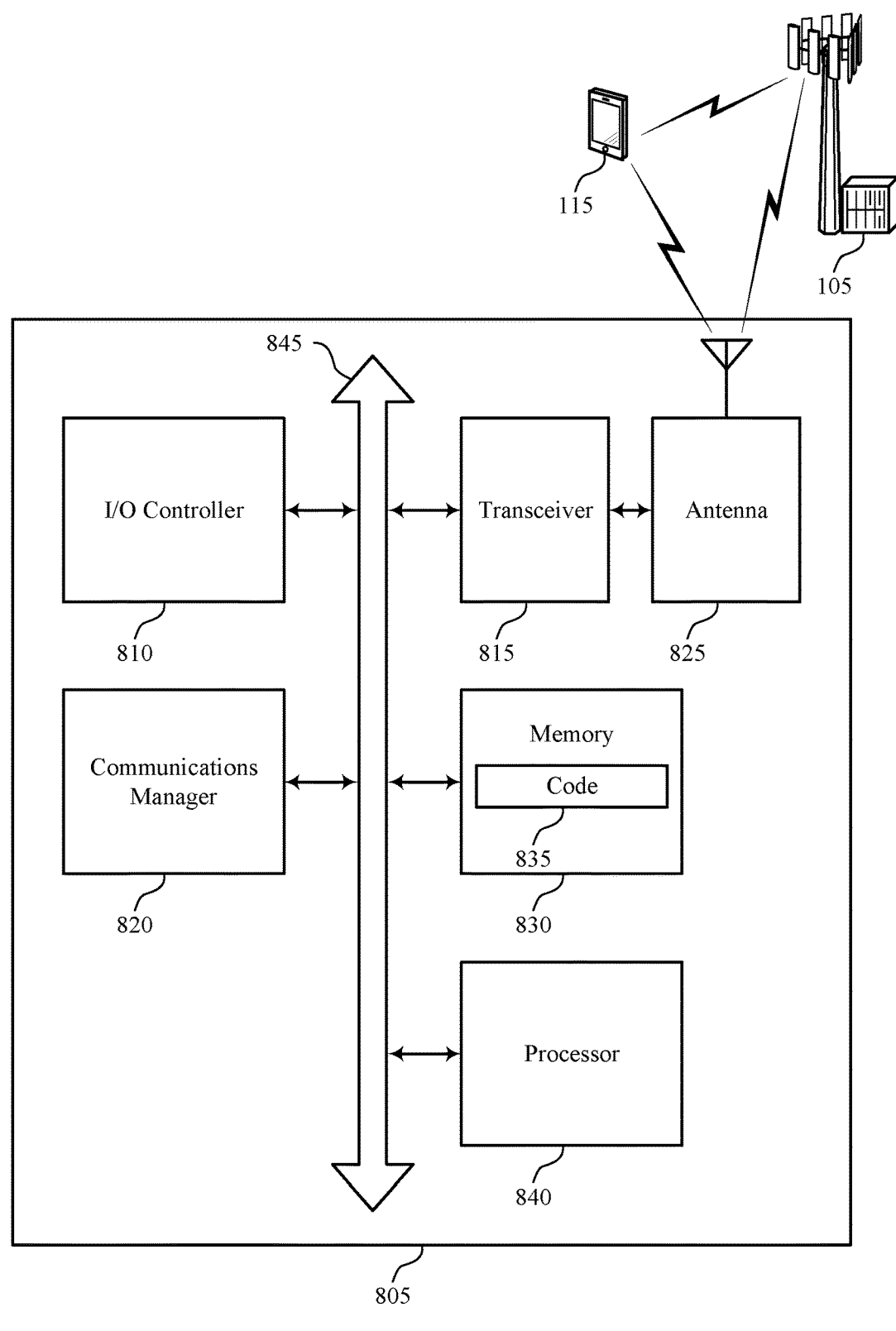
FIG. 8 shows a diagram of a system including a device that supports code block group based cross-bandwidth part scheduling in accordance with aspects of the present disclosure.

FIG. 8 shows a diagram of a system 800 including a device 805 that supports CBG based cross-BWP scheduling in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting CBG based cross-BWP scheduling). For example, the device 805 or a component of the device 805 may include a processor 840 and memory 830 coupled to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for receiving DCI scheduling a downlink transmission from a base station to the UE across a set of multiple BWPs. The communications manager 820 may be configured as or otherwise support a means for receiving an indication of a CBG mapping for the downlink transmission, where a TB of the downlink transmission includes multiple CBGs that are mapped across the set of multiple BWPs in accordance with the CBG mapping. The communications manager 820 may be configured as or otherwise support a means for monitoring for the TB across the set of multiple BWPs in accordance with the CBG mapping.

By including or configuring the communications manager 820 in accordance with examples as described herein, the device 805 may support techniques for signaling a CBG mapping across multiple BWPs, which may cause improved communication reliability, reduced latency, improved user experience related to reduced processing, reduced power consumption, more efficient utilization of communication resources, improved coordination between devices, longer battery life, improved utilization of processing capability, or the like based on reducing unnecessary retransmissions of CBGs and increase usable frequency resources.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of CBG based cross-BWP scheduling as described herein, or the processor 840 and the memory 830 may be otherwise configured to perform or support such operations.

Figure 9:
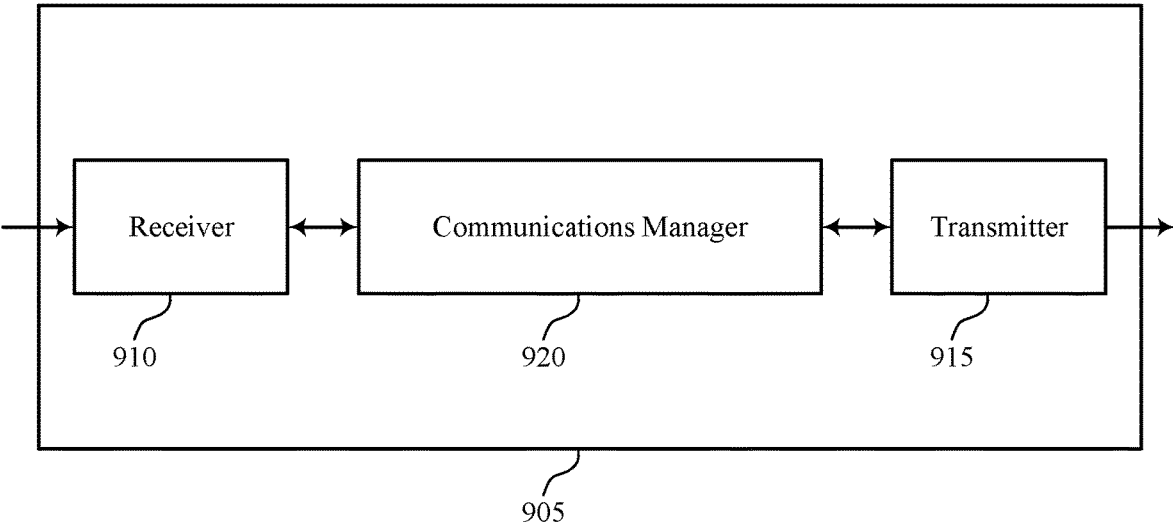
FIGS. 9 and 10 show block diagrams of devices that support code block group based cross-bandwidth part scheduling in accordance with aspects of the present disclosure.

FIG. 9 shows a block diagram 900 of a device 905 that supports CBG based cross-BWP scheduling in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to CBG based cross-BWP scheduling). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to CBG based cross-BWP scheduling). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of CBG based cross-BWP scheduling as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a base station in accordance with examples as disclosed herein. For example, the communications manager 920 may be configured as or otherwise support a means for transmitting DCI scheduling a downlink transmission from the base station to a UE across a set of multiple BWPs. The communications manager 920 may be configured as or otherwise support a means for transmitting, to the UE, an indication of a CBG mapping for the downlink transmission, where a TB of the downlink transmission includes multiple CBGs that are mapped across the set of multiple BWPs in accordance with the CBG mapping. The communications manager 920 may be configured as or otherwise support a means for transmitting, to the UE, the TB across the set of multiple BWPs in accordance with the CBG mapping.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for signaling a CBG mapping across multiple BWPs, which may cause reduced processing, reduced power consumption, more efficient utilization of communication resources, or the like based on reducing unnecessary retransmissions of CBGs and increase usable frequency resources.

Figure 10:

FIG. 10 shows a block diagram 1000 of a device 1005 that supports CBG based cross-BWP scheduling in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to CBG based cross-BWP scheduling). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to CBG based cross-BWP scheduling). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of CBG based cross-BWP scheduling as described herein. For example, the communications manager 1020 may include a scheduling component 1025, a CBG mapping component 1030, a TB component 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station in accordance with examples as disclosed herein. The scheduling component 1025 may be configured as or otherwise support a means for transmitting DCI scheduling a downlink transmission from the base station to a UE across a set of multiple BWPs. The CBG mapping component 1030 may be configured as or otherwise support a means for transmitting, to the UE, an indication of a CBG mapping for the downlink transmission, where a TB of the downlink transmission includes multiple CBGs that are mapped across the set of multiple BWPs in accordance with the CBG mapping. The TB component 1035 may be configured as or otherwise support a means for transmitting, to the UE, the TB across the set of multiple BWPs in accordance with the CBG mapping.

FIG. 11 shows a block diagram 1100 of a communications manager 1120 that supports CBG based cross-BWP scheduling in accordance with aspects of the present disclosure. The communications manager 1120 may be an example of aspects of a communications manager 920, a communications manager 1020, or both, as described herein. The communications manager 1120, or various components thereof, may be an example of means for performing various aspects of CBG based cross-BWP scheduling as described herein. For example, the communications manager 1120 may include a scheduling component 1125, a CBG mapping component 1130, a TB component 1135, a feedback component 1140, or any combination thereof. Each of these components may communicate, directly or indirectly, with one another (e.g., via one or more buses).

The communications manager 1120 may support wireless communications at a base station in accordance with examples as disclosed herein. The scheduling component 1125 may be configured as or otherwise support a means for transmitting DCI scheduling a downlink transmission from the base station to a UE across a set of multiple BWPs. The CBG mapping component 1130 may be configured as or otherwise support a means for transmitting, to the UE, an indication of a CBG mapping for the downlink transmission, where a TB of the downlink transmission includes multiple CBGs that are mapped across the set of multiple BWPs in accordance with the CBG mapping. The TB component 1135 may be configured as or otherwise support a means for transmitting, to the UE, the TB across the set of multiple BWPs in accordance with the CBG mapping. In some examples, to support transmitting the TB, the CBG mapping component 1130 may be configured as or otherwise support a means for transmitting at least one CBG that is split across at least two BWPs of the set of multiple BWPs in accordance with the CBG mapping. In some examples, to support transmitting the TB, the CBG mapping component 1130 may be configured as or otherwise support a means for transmitting at least a first CBG that is completely contained within a first BWP and at least a second CBG that is completely contained within a second BWP, in accordance with the CBG mapping. In some examples, a first MCS of the first CBG and a second MCS of the second CBG differ.

In some examples, the TB component 1135 may be configured as or otherwise support a means for encoding the TB based on the CBG mapping. In some examples, the feedback component 1140 may be configured as or otherwise support a means for receiving, from the UE, a feedback message that provides CBG-level feedback for an initial transmission based on whether respective CBGs were decoded successfully at the UE during the initial transmission.

In some examples, the CBG mapping component 1130 may be configured as or otherwise support a means for transmitting, to the UE, a retransmission of one or more CBGs of the multiple CBGs in response to the feedback message, where at least one of the one or more CBGs is transmitted via the retransmission on a second BWP different from a first BWP on which the at least one of the one or more CBGs was transmitted via the initial transmission. In some examples, the second BWP is associated with a higher rate of successful decoding of CBGs during the initial transmission than the first BWP.

In some examples, the CBG mapping component 1130 may be configured as or otherwise support a means for transmitting the retransmission of the at least one of the one or more CBGs on the second BWP based on the second BWP being associated with a higher rate of successful decoding of CBGs during the initial transmission than the first BWP.

Figure 12:
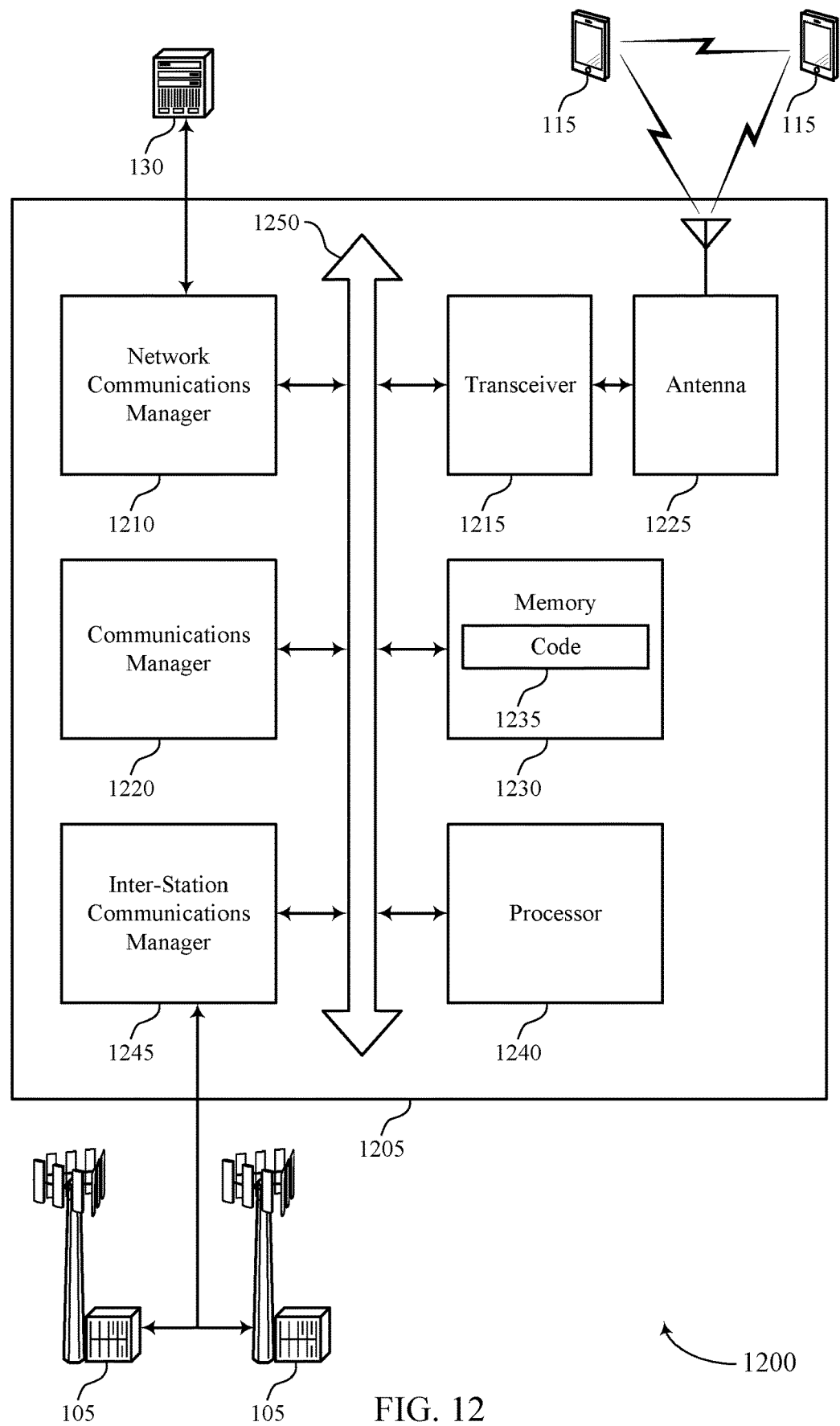
FIG. 12 shows a diagram of a system including a device that supports code block group based cross-bandwidth part scheduling in accordance with aspects of the present disclosure.

FIG. 12 shows a diagram of a system 1200 including a device 1205 that supports CBG based cross-BWP scheduling in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting CBG based cross-BWP scheduling). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with ULEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communications at a base station in accordance with examples as disclosed herein. For example, the communications manager 1220 may be configured as or otherwise support a means for transmitting DCI scheduling a downlink transmission from the base station to a UE across a set of multiple BWPs. The communications manager 1220 may be configured as or otherwise support a means for transmitting, to the UE, an indication of a CBG mapping for the downlink transmission, where a TB of the downlink transmission includes multiple CBGs that are mapped across the set of multiple BWPs in accordance with the CBG mapping. The communications manager 1220 may be configured as or otherwise support a means for transmitting, to the UE, the TB across the set of multiple BWPs in accordance with the CBG mapping.

By including or configuring the communications manager 1220 in accordance with examples as described herein, the device 1205 may support techniques for signaling a CBG mapping across multiple BWPs, which may cause improved communication reliability, reduced latency, improved user experience related to reduced processing, reduced power consumption, more efficient utilization of communication resources, improved coordination between devices, longer battery life, improved utilization of processing capability, or the like based on reducing unnecessary retransmissions of CBGs and increase usable frequency resources.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of CBG based cross-BWP scheduling as described herein, or the processor 1240 and the memory 1230 may be otherwise configured to perform or support such operations.

FIG. 13 shows a flowchart illustrating a method 1300 that supports CBG based cross-BWP scheduling in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving DCI scheduling a downlink transmission from a base station to the UE across a set of multiple BWPs. The operations of 1305 may be performed in accordance with examples as disclosed herein. In some examples, aspects of the operations of 1305 may be performed by a scheduling component 725 as described with reference to FIG. 7.

At 1310, the method may include receiving an indication of a CBG mapping for the downlink transmission, where a TB of the downlink transmission includes multiple CBGs that are mapped across the set of multiple BWPs in accordance with the CBG mapping. The operations of 1310 may be performed in accordance with examples as disclosed herein. In some examples, aspects of the operations of 1310 may be performed by a CBG mapping component 730 as described with reference to FIG. 7.

At 1315, the method may include monitoring for the TB across the set of multiple BWPs in accordance with the CBG mapping. The operations of 1315 may be performed in accordance with examples as disclosed herein. In some examples, aspects of the operations of 1315 may be performed by a TB component 735 as described with reference to FIG. 7.

FIG. 14 shows a flowchart illustrating a method 1400 that supports CBG based cross-BWP scheduling in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include receiving DCI scheduling a downlink transmission from a base station to the UE across a set of multiple BWPs. The operations of 1405 may be performed in accordance with examples as disclosed herein. In some examples, aspects of the operations of 1405 may be performed by a scheduling component 725 as described with reference to FIG. 7.

At 1410, the method may include receiving an indication of a CBG mapping for the downlink transmission, where a TB of the downlink transmission includes multiple CBGs that are mapped across the set of multiple BWPs in accordance with the CBG mapping. The operations of 1410 may be performed in accordance with examples as disclosed herein. In some examples, aspects of the operations of 1410 may be performed by a CBG mapping component 730 as described with reference to FIG. 7.

At 1415, the method may include monitoring for the TB across the set of multiple BWPs in accordance with the CBG mapping. The operations of 1415 may be performed in accordance with examples as disclosed herein. In some examples, aspects of the operations of 1415 may be performed by a TB component 735 as described with reference to FIG. 7.

At 1420, the method may include monitoring for at least one CBG that is split across at least two BWPs of the set of multiple BWPs in accordance with the CBG mapping. The operations of 1420 may be performed in accordance with examples as disclosed herein. In some examples, aspects of the operations of 1420 may be performed by a CBG mapping component 730 as described with reference to FIG. 7.

Figure 15:
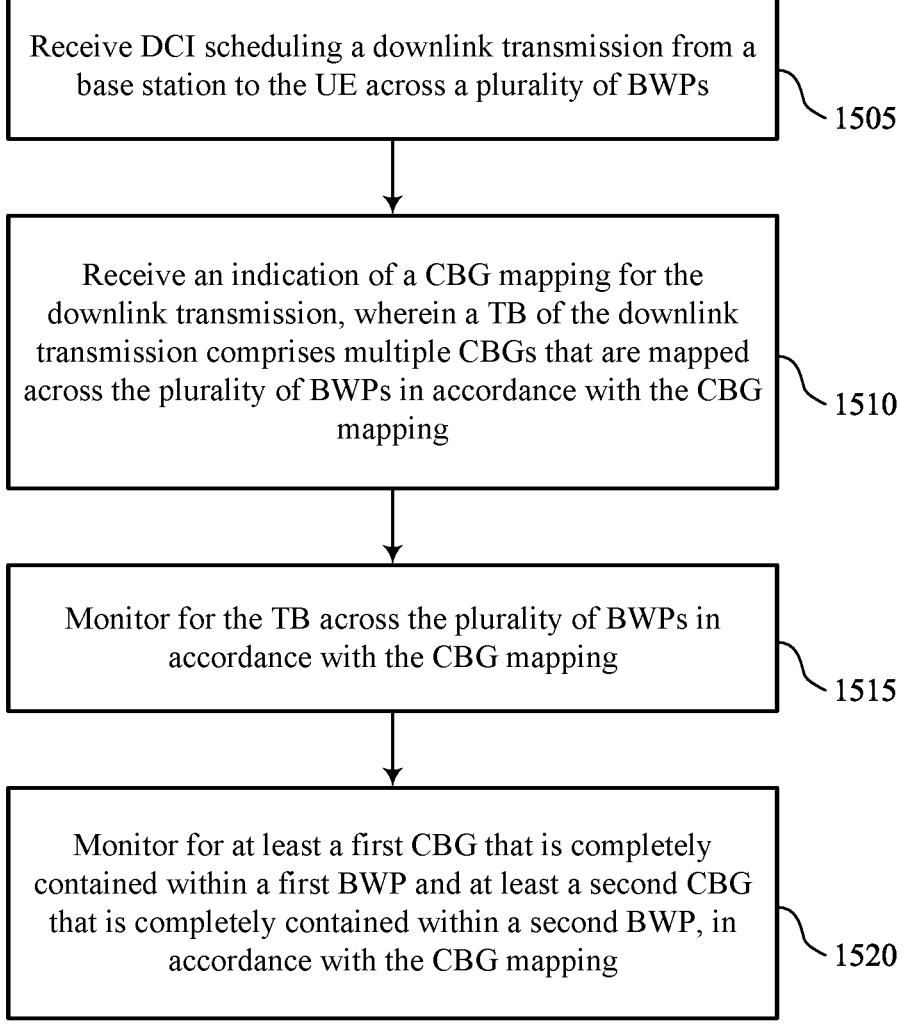

FIG. 15 shows a flowchart illustrating a method 1500 that supports CBG based cross-BWP scheduling in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, the method may include receiving DCI scheduling a downlink transmission from a base station to the UE across a set of multiple BWPs. The operations of 1505 may be performed in accordance with examples as disclosed herein. In some examples, aspects of the operations of 1505 may be performed by a scheduling component 725 as described with reference to FIG. 7.

At 1510, the method may include receiving an indication of a CBG mapping for the downlink transmission, where a TB of the downlink transmission includes multiple CBGs that are mapped across the set of multiple BWPs in accordance with the CBG mapping. The operations of 1510 may be performed in accordance with examples as disclosed herein. In some examples, aspects of the operations of 1510 may be performed by a CBG mapping component 730 as described with reference to FIG. 7.

At 1515, the method may include monitoring for the TB across the set of multiple BWPs in accordance with the CBG mapping. The operations of 1515 may be performed in accordance with examples as disclosed herein. In some examples, aspects of the operations of 1515 may be performed by a TB component 735 as described with reference to FIG. 7.

At 1520, the method may include monitoring for at least a first CBG that is completely contained within a first BWP and at least a second CBG that is completely contained within a second BWP, in accordance with the CBG mapping. The operations of 1520 may be performed in accordance with examples as disclosed herein. In some examples, aspects of the operations of 1520 may be performed by a CBG mapping component 730 as described with reference to FIG. 7.

FIG. 16 shows a flowchart illustrating a method 1600 that supports CBG based cross-BWP scheduling in accordance with aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1605, the method may include transmitting DCI scheduling a downlink transmission from the base station to a UE across a set of multiple BWPs. The operations of 1605 may be performed in accordance with examples as disclosed herein. In some examples, aspects of the operations of 1605 may be performed by a scheduling component 1125 as described with reference to FIG. 11.

At 1610, the method may include transmitting, to the UE, an indication of a CBG mapping for the downlink transmission, where a TB of the downlink transmission includes multiple CBGs that are mapped across the set of multiple BWPs in accordance with the CBG mapping. The operations of 1610 may be performed in accordance with examples as disclosed herein. In some examples, aspects of the operations of 1610 may be performed by a CBG mapping component 1130 as described with reference to FIG. 11.

At 1615, the method may include transmitting, to the UE, the TB across the set of multiple BWPs in accordance with the CBG mapping. The operations of 1615 may be performed in accordance with examples as disclosed herein. In some examples, aspects of the operations of 1615 may be performed by a TB component 1135 as described with reference to FIG. 11.

FIG. 17 shows a flowchart illustrating a method 1700 that supports CBG based cross-BWP scheduling in accordance with aspects of the present disclosure. The operations of the method 1700 may be implemented by a base station or its components as described herein. For example, the operations of the method 1700 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1705, the method may include transmitting DCI scheduling a downlink transmission from the base station to a UE across a set of multiple BWPs. The operations of 1705 may be performed in accordance with examples as disclosed herein. In some examples, aspects of the operations of 1705 may be performed by a scheduling component 1125 as described with reference to FIG. 11.

At 1710, the method may include transmitting, to the UE, an indication of a CBG mapping for the downlink transmission, where a TB of the downlink transmission includes multiple CBGs that are mapped across the set of multiple BWPs in accordance with the CBG mapping. The operations of 1710 may be performed in accordance with examples as disclosed herein. In some examples, aspects of the operations of 1710 may be performed by a CBG mapping component 1130 as described with reference to FIG. 11.

At 1715, the method may include encoding the TB based on the CBG mapping. The operations of 1715 may be performed in accordance with examples as disclosed herein. In some examples, aspects of the operations of 1715 may be performed by a TB component 1135 as described with reference to FIG. 11.

At 1720, the method may include transmitting, to the UE, the TB across the set of multiple BWPs in accordance with the CBG mapping. The operations of 1720 may be performed in accordance with examples as disclosed herein. In some examples, aspects of the operations of 1720 may be performed by a TB component 1135 as described with reference to FIG. 11.

At 1725, the method may include receiving, from the UE, a feedback message that provides CBG-level feedback for an initial transmission based on whether respective CBGs were decoded successfully at the UE during the initial transmission. The operations of 1725 may be performed in accordance with examples as disclosed herein. In some examples, aspects of the operations of 1725 may be performed by a feedback component 1140 as described with reference to FIG. 11.

The following provides an overview of aspects of the present disclosure:

Aspect 1: A method for wireless communications at a UE, comprising: receiving downlink control information scheduling a downlink transmission from a base station to the UE across a plurality of bandwidth parts; receiving an indication of a code block group mapping for the downlink transmission, wherein a transport block of the downlink transmission comprises multiple code block groups that are mapped across the plurality of bandwidth parts in accordance with the code block group mapping; and monitoring for the transport block across the plurality of bandwidth parts in accordance with the code block group mapping.

Aspect 2: The method of aspect 1, wherein monitoring for the transport block comprises: monitoring for at least one code block group that is split across at least two bandwidth parts of the plurality of bandwidth parts in accordance with the code block group mapping.

Aspect 3: The method of aspect 1, wherein monitoring for the transport block comprises: monitoring for at least a first code block group that is completely contained within a first bandwidth part and at least a second code block group that is completely contained within a second bandwidth part, in accordance with the code block group mapping.

Aspect 4: The method of aspect 3, wherein a first modulation and coding scheme of the first code block group and a second modulation and coding scheme of the second code block group differ.

Aspect 5: The method of any of aspects 1 through 4, further comprising: attempting to decode the transport block based at least in part on the code block group mapping; and transmitting a feedback message that provides code block group-level feedback for an initial transmission based at least in part on whether respective code block groups were decoded successfully during the initial transmission.

Aspect 6: The method of aspect 5, further comprising: monitoring for a retransmission of one or more code block groups of the multiple code block groups in response to the feedback message, wherein the UE monitors for at least one of the one or more code block groups of the retransmission on a second bandwidth part different from a first bandwidth part on which the UE monitored for the at least one of the one or more code block groups of the initial transmission.

Aspect 7: The method of aspect 6, wherein the second bandwidth part is associated with a higher rate of successful decoding of code block groups during the initial transmission than the first bandwidth part.

Aspect 8: The method of any of aspects 6 through 7, further comprising: determining to monitor the second bandwidth part for retransmission of the at least one of the one or more code block groups based at least in part on the second bandwidth part being associated with a higher rate of successful decoding of code block groups during the initial transmission than the first bandwidth part.

Aspect 9: The method of any of aspects 1 through 8, further comprising: calculating a size of the transport block for each bandwidth part of the plurality of bandwidth parts; and calculating a maximum number of code block groups for each bandwidth part of the plurality of bandwidth parts.

Aspect 10: The method of any of aspects 1 through 8, further comprising: calculating a bandwidth part-based size of the transport block for each bandwidth part of the plurality of bandwidth parts; determining a transport block size based on a sum of each of the bandwidth part-based sizes; and calculating a maximum number of code block groups for the plurality of bandwidth parts based at least in part on available resources across all of the plurality of bandwidth parts.

Aspect 11: A method for wireless communications at a base station, comprising: transmitting downlink control information scheduling a downlink transmission from the base station to a UE across a plurality of bandwidth parts; transmitting, to the UE, an indication of a code block group mapping for the downlink transmission, wherein a transport block of the downlink transmission comprises multiple code block groups that are mapped across the plurality of bandwidth parts in accordance with the code block group mapping; and transmitting, to the UE, the transport block across the plurality of bandwidth parts in accordance with the code block group mapping.

Aspect 12: The method of aspect 11, wherein transmitting the transport block comprises: transmitting at least one code block group that is split across at least two bandwidth parts of the plurality of bandwidth parts in accordance with the code block group mapping.

Aspect 13: The method of aspect 11, wherein transmitting the transport block comprises: transmitting at least a first code block group that is completely contained within a first bandwidth part and at least a second code block group that is completely contained within a second bandwidth part, in accordance with the code block group mapping.

Aspect 14: The method of aspect 13, wherein a first modulation and coding scheme of the first code block group and a second modulation and coding scheme of the second code block group differ.

Aspect 15: The method of any of aspects 11 through 14, further comprising: encoding the transport block based at least in part on the code block group mapping; and receiving, from the UE, a feedback message that provides code block group-level feedback for an initial transmission based at least in part on whether respective code block groups were decoded successfully at the UE during the initial transmission.

Aspect 16: The method of aspect 15, further comprising: transmitting, to the UE, a retransmission of one or more code block groups of the multiple code block groups in response to the feedback message, wherein at least one of the one or more code block groups is transmitted via the retransmission on a second bandwidth part different from a first bandwidth part on which the at least one of the one or more code block groups was transmitted via the initial transmission.

Aspect 17: The method of aspect 16, wherein the second bandwidth part is associated with a higher rate of successful decoding of code block groups during the initial transmission than the first bandwidth part.

Aspect 18: The method of any of aspects 16 through 17, further comprising: transmitting the retransmission of the at least one of the one or more code block groups on the second bandwidth part based at least in part on the second bandwidth part being associated with a higher rate of successful decoding of code block groups during the initial transmission than the first bandwidth part.

Aspect 19: An apparatus for wireless communications at a UE, comprising a processor; memory coupled with the processor; and instructions stored in the memory and executable by the processor to cause the apparatus to perform a method of any of aspects 1 through 10.

Aspect 20: An apparatus for wireless communications at a UE, comprising at least one means for performing a method of any of aspects 1 through 10.

Aspect 21: A non-transitory computer-readable medium storing code for wireless communications at a UE, the code comprising instructions executable by a processor to perform a method of any of aspects 1 through 10.

Aspect 22: An apparatus for wireless communications at a base station, comprising a processor; memory coupled with the processor; and instructions stored in the memory and executable by the processor to cause the apparatus to perform a method of any of aspects 11 through 18.

Aspect 23: An apparatus for wireless communications at a base station, comprising at least one means for performing a method of any of aspects 11 through 18.

Aspect 24: A non-transitory computer-readable medium storing code for wireless communications at a base station, the code comprising instructions executable by a processor to perform a method of any of aspects 11 through 18.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:

receiving downlink control information scheduling a downlink transmission from a network device to the UE across a plurality of bandwidth parts comprising a first downlink bandwidth part and a second downlink bandwidth part, wherein the first downlink bandwidth part and the second downlink bandwidth part are separated by one or more uplink bandwidth parts;

receiving an indication of a code block group mapping for the downlink transmission, wherein a transport block of the downlink transmission comprises multiple code block groups that are mapped across at least the first downlink bandwidth part and the second downlink bandwidth part of the plurality of bandwidth parts in accordance with the code block group mapping; and monitoring for the multiple code block groups of the transport block across at least the first downlink bandwidth part and the second downlink bandwidth part of the plurality of bandwidth parts in accordance with the code block group mapping.

2. The method of claim 1, wherein monitoring for the transport block comprises:

monitoring for at least one code block group that is split across at least the first downlink bandwidth part and the second downlink bandwidth part of the plurality of bandwidth parts in accordance with the code block group mapping.

3. The method of claim 1, wherein monitoring for the transport block comprises:

monitoring for at least a first code block group that is completely contained within the first downlink bandwidth part and at least a second code block group that is completely contained within the second downlink bandwidth part, in accordance with the code block group mapping.

4. The method of claim 3, wherein a first modulation and coding scheme of the first code block group and a second modulation and coding scheme of the second code block group differ.

5. The method of claim 1, further comprising:

attempting to decode the transport block based at least in part on the code block group mapping; and transmitting a feedback message that provides code block group-level feedback for an initial transmission based at least in part on whether respective code block groups were decoded successfully during the initial transmission.

6. The method of claim 5, further comprising:

monitoring for a retransmission of one or more code block groups of the multiple code block groups in response to the feedback message, wherein the UE monitors for at least one of the one or more code block groups of the retransmission on a second bandwidth part different from a first bandwidth part on which the UE monitored for the at least one of the one or more code block groups of the initial transmission.

7. The method of claim 6, wherein the second bandwidth part is associated with a higher rate of successful decoding of code block groups during the initial transmission than the first bandwidth part.

8. The method of claim 6, further comprising:

determining to monitor the second bandwidth part for retransmission of the at least one of the one or more code block groups based at least in part on the second bandwidth part being associated with a higher rate of successful decoding of code block groups during the initial transmission than the first bandwidth part.

9. The method of claim 1, further comprising:

calculating a size of the transport block for each bandwidth part of the plurality of bandwidth parts; and calculating a maximum number of code block groups for each bandwidth part of the plurality of bandwidth parts.

10. The method of claim 1, further comprising:

calculating a bandwidth part-based size of the transport block for each bandwidth part of the plurality of bandwidth parts;

determining a transport block size based on a sum of each of the bandwidth part-based sizes; and calculating a maximum number of code block groups for the plurality of bandwidth parts based at least in part on available resources across all of the plurality of bandwidth parts.

11. A method for wireless communications at a network device, comprising:

transmitting downlink control information scheduling a downlink transmission from the network device to a user equipment (UE) across a plurality of bandwidth parts comprising a first downlink bandwidth part and a second downlink bandwidth part, wherein the first downlink bandwidth part and the second downlink bandwidth part are separated by one or more uplink bandwidth parts;

transmitting, to the UE, an indication of a code block group mapping for the downlink transmission, wherein a transport block of the downlink transmission comprises multiple code block groups that are mapped across at least the first downlink bandwidth part and the second downlink bandwidth part of the plurality of bandwidth parts in accordance with the code block group mapping; and transmitting, to the UE, the multiple code block groups of the transport block across at least the first downlink bandwidth part and the second downlink bandwidth part of the plurality of bandwidth parts in accordance with the code block group mapping.

12. The method of claim 11, wherein transmitting the transport block comprises:

transmitting at least one code block group that is split across at least the first downlink bandwidth part and the second downlink bandwidth part of the plurality of bandwidth parts in accordance with the code block group mapping.

13. The method of claim 11, wherein transmitting the transport block comprises:

transmitting at least a first code block group that is completely contained within the first downlink bandwidth part and at least a second code block group that is completely contained within the second downlink bandwidth part, in accordance with the code block group mapping.

14. The method of claim 13, wherein a first modulation and coding scheme of the first code block group and a second modulation and coding scheme of the second code block group differ.

15. The method of claim 11, further comprising:

encoding the transport block based at least in part on the code block group mapping; and receiving, from the UE, a feedback message that provides code block group-level feedback for an initial transmission based at least in part on whether respective code block groups were decoded successfully at the UE during the initial transmission.

16. The method of claim 15, further comprising:

transmitting, to the UE, a retransmission of one or more code block groups of the multiple code block groups in response to the feedback message, wherein at least one of the one or more code block groups is transmitted via the retransmission on a second bandwidth part different from a first bandwidth part on which the at least one of the one or more code block groups was transmitted via the initial transmission.

17. The method of claim 16, wherein the second bandwidth part is associated with a higher rate of successful decoding of code block groups during the initial transmission than the first bandwidth part.

18. The method of claim 16, further comprising:

transmitting the retransmission of the at least one of the one or more code block groups on the second bandwidth part based at least in part on the second bandwidth part being associated with a higher rate of successful decoding of code block groups during the initial transmission than the first bandwidth part.

19. An apparatus for wireless communication, comprising:

one or more processors;

memory coupled with the one or more processors; and instructions stored in the memory and executable by the one or more processors to cause the apparatus to:

receive downlink control information scheduling a downlink transmission from a network device to a user equipment (UE) across a plurality of bandwidth parts comprising a first downlink bandwidth part and a second downlink bandwidth part, wherein the first downlink bandwidth part and the second downlink bandwidth part are separated by one or more uplink bandwidth parts;

receive an indication of a code block group mapping for the downlink transmission, wherein a transport block of the downlink transmission comprises multiple code block groups that are mapped across at least the first downlink bandwidth part and the second downlink bandwidth part of the plurality of bandwidth parts in accordance with the code block group mapping; and monitor for the multiple code block groups of the transport block across at least the first downlink bandwidth part and the second downlink bandwidth part of the plurality of bandwidth parts in accordance with the code block group mapping.

20. The apparatus of claim 19, wherein the instructions to monitor for the transport block are executable by the one or more processors to cause the apparatus to:

monitor for at least one code block group that is split across at least the first downlink bandwidth part and the second downlink bandwidth part of the plurality of bandwidth parts in accordance with the code block group mapping.

21. The apparatus of claim 19, wherein the instructions to monitor for the transport block are executable by the one or more processors to cause the apparatus to:

monitor for at least a first code block group that is completely contained within the first downlink bandwidth part and at least a second code block group that is completely contained within the second downlink bandwidth part, in accordance with the code block group mapping.

22. The apparatus of claim 19, wherein the instructions are further executable by the one or more processors to cause the apparatus to:

attempt to decode the transport block based at least in part on the code block group mapping; and transmit a feedback message that provides code block group-level feedback for an initial transmission based at least in part on whether respective code block groups were decoded successfully during the initial transmission.

23. The apparatus of claim 22, wherein the instructions are further executable by the one or more processors to cause the apparatus to:

monitor for a retransmission of one or more code block groups of the multiple code block groups in response to the feedback message, wherein the UE monitors for at least one of the one or more code block groups of the retransmission on a second bandwidth part different from a first bandwidth part on which the UE monitored for the at least one of the one or more code block groups of the initial transmission.

24. The apparatus of claim 19, wherein the instructions are further executable by the one or more processors to cause the apparatus to:

calculate a size of the transport block for each bandwidth part of the plurality of bandwidth parts; and calculate a maximum number of code block groups for each bandwidth part of the plurality of bandwidth parts.

25. The apparatus of claim 19, wherein the instructions are further executable by the one or more processors to cause the apparatus to:

calculate a bandwidth part-based size of the transport block for each bandwidth part of the plurality of bandwidth parts;

determine a transport block size based on a sum of each of the bandwidth part-based sizes; and calculate a maximum number of code block groups for the plurality of bandwidth parts based at least in part on available resources across all of the plurality of bandwidth parts.

26. An apparatus for wireless communication, comprising:

one or more processors;

memory coupled with the one or more processors; and instructions stored in the memory and executable by the one or more processors to cause the apparatus to:

transmit downlink control information scheduling a downlink transmission from a network device to a user equipment (UE) across a plurality of bandwidth parts comprising a first downlink bandwidth part and a second downlink bandwidth part, wherein the first downlink bandwidth part and the second downlink bandwidth part are separated by one or more uplink bandwidth parts;

transmit, to the UE, an indication of a code block group mapping for the downlink transmission, wherein a transport block of the downlink transmission comprises multiple code block groups that are mapped across at least the first downlink bandwidth part and the second downlink bandwidth part of the plurality of bandwidth parts in accordance with the code block group mapping; and transmit, to the UE, the multiple code block groups of the transport block across at least the first downlink bandwidth part and the second downlink bandwidth part of the plurality of bandwidth parts in accordance with the code block group mapping.

27. The apparatus of claim 26, wherein the instructions to transmit the transport block are executable by the one or more processors to cause the apparatus to:

transmit at least one code block group that is split across at least the first downlink bandwidth part and the second downlink bandwidth part of the plurality of bandwidth parts in accordance with the code block group mapping.

28. The apparatus of claim 26, wherein the instructions to transmit the transport block are executable by the one or more processors to cause the apparatus to:

transmit at least a first code block group that is completely contained within the first downlink bandwidth part and at least a second code block group that is completely contained within the second downlink bandwidth part, in accordance with the code block group mapping.

29. The apparatus of claim 26, wherein the instructions are further executable by the one or more processors to cause the apparatus to:

encode the transport block based at least in part on the code block group mapping; and receive, from the UE, a feedback message that provides code block group-level feedback for an initial transmission based at least in part on whether respective code block groups were decoded successfully at the UE during the initial transmission.

30. The apparatus of claim 29, wherein the instructions are further executable by the one or more processors to cause the apparatus to:

transmit, to the UE, a retransmission of one or more code block groups of the multiple code block groups in response to the feedback message, wherein at least one of the one or more code block groups is transmitted via the retransmission on a second bandwidth part different from a first bandwidth part on which the UE monitored for the at least one of the one or more code block groups of the initial transmission.

* * * * *